US010817845B2

(12) United States Patent
Pandey et al.

(10) Patent No.: US 10,817,845 B2
(45) Date of Patent: Oct. 27, 2020

(54) UPDATING MESSAGING DATA STRUCTURES TO INCLUDE PREDICTED ATTRIBUTE VALUES ASSOCIATED WITH RECIPIENT ENTITIES

(71) Applicant: The Rocket Science Group LLC, Atlanta, GA (US)

(72) Inventors: Nitish Pandey, Atlanta, GA (US); John Foreman, Avondale Estates, GA (US); Jason Veatch, Atlanta, GA (US); Cass Petrus, Atlanta, GA (US)

(73) Assignee: THE ROCKET SCIENCE GROUP LLC, Atlanta, GA (US)

( * ) Notice: Subject to any disclaimer, the term of this patent is extended or adjusted under 35 U.S.C. 154(b) by 128 days.

(21) Appl. No.: 16/081,146

(22) PCT Filed: Mar. 30, 2017

(86) PCT No.: PCT/US2017/024985
§ 371 (c)(1),
(2) Date: Aug. 30, 2018

(87) PCT Pub. No.: WO2017/173063
PCT Pub. Date: Oct. 5, 2017

(65) Prior Publication Data
US 2019/0080290 A1 Mar. 14, 2019

Related U.S. Application Data
(60) Provisional application No. 62/315,143, filed on Mar. 30, 2016.

(51) Int. Cl.
G06Q 30/02 (2012.01)
G06Q 10/10 (2012.01)
(Continued)

(52) U.S. Cl.
CPC ....... *G06Q 10/107* (2013.01); *G06F 16/9032* (2019.01); *G06Q 10/0637* (2013.01);
(Continued)

(58) Field of Classification Search
CPC ...................................... G06Q 30/02
See application file for complete search history.

(56) References Cited

U.S. PATENT DOCUMENTS 9,177,293 B1 * 11/2015 Gagnon .............. G06Q 10/107
2011/0131166 A1 6/2011 Li et al.
(Continued)

FOREIGN PATENT DOCUMENTS

WO 2012017279 A2 2/2012
WO 2017173063 10/2017

OTHER PUBLICATIONS

PCT/US2017/024985, "International Preliminary Report on Patentability", dated Oct. 11, 2018, 6 pages.
(Continued)

Primary Examiner — Marilyn G Macasiano
(74) Attorney, Agent, or Firm — Kilpatrick Townsend & Stockton LLP

(57) ABSTRACT

This disclosure involves modifying messaging data having unknown attribute values associated with entities to facilitate retrieval of address data for communications with the entities. For example, a system accesses a mapping of first addresses to an attribute, wherein the first addresses include (1) a target address for a target entity and (2) addresses associated with first entities in turn associated with first known values of the attribute. The system accesses a mapping of second addresses to an attribute, wherein the second addresses include (1) the target address for the target entity and (2) addresses associated with second entities in turn associated with second known values of the attribute. The (Continued)

system determines distributions of the first known values and the second known values, predicts a value of the attribute for the target entity based thereon, updates the messaging data therewith, and services a query for addresses having the predicted value.

21 Claims, 14 Drawing Sheets

(51) Int. Cl.
  *G06Q 10/06* (2012.01)
  *G06Q 50/00* (2012.01)
  *G06F 16/9032* (2019.01)

(52) U.S. Cl.
  CPC ......... *G06Q 10/10* (2013.01); *G06Q 30/0201* (2013.01); *G06Q 30/0269* (2013.01); *G06Q 50/01* (2013.01)

(56) References Cited

U.S. PATENT DOCUMENTS

| | | |
|---|---|---|
| 2012/0023046 A1 | 1/2012 | Verma et al. |
| 2013/0246164 A1* | 9/2013 | Khanna .............. G06Q 30/0267 705/14.45 |
| 2015/0120755 A1 | 4/2015 | Burger et al. |
| 2015/0332297 A1 | 11/2015 | Gaunt et al. |

OTHER PUBLICATIONS

PCT/US2017/024985, "International Search Report and Written Opinion", dated Jun. 27, 2017, 9 pages.

\* cited by examiner

UPDATING MESSAGING DATA STRUCTURES TO INCLUDE PREDICTED ATTRIBUTE VALUES ASSOCIATED WITH RECIPIENT ENTITIES

RELATED APPLICATIONS

This disclosure claims priority to U.S. Provisional Application No. 62/315,143, entitled "Predicting User Attributes Based on Electronic Communications Involving Users," filed Mar. 30, 2016, the entirety of which is hereby incorporated by reference herein.

FIELD OF THE INVENTION

This disclosure relates generally to computer-implemented methods and systems for managing the content of a messaging data structure to facilitate the retrieval of information used for communication via a data network, and more particularly relates to updating messaging data structures to include predicted attribute values associated with recipient entities and thereby facilitating retrieval of address data for electronic communications with the recipient entities.

BACKGROUND

Messaging data structures, such as databases, store information that is used for communication of electronic message via a data network. A messaging data structure can include a database or other data structure that is used to store data samples with values of different attributes used in communicating electronic messages. For example, electronic messages, such as e-mails and text messages, can be used by vendors and other senders to induce various recipient entities (e.g., customers and other users) to access online content. A communication system is accessed by used by vendors and other senders to perform these communications. The communication system uses a messaging data structure to manage these communications (e.g., by selecting certain groups of recipient entities to which electronic messages will be transmitted).

However, messaging data structures may include suboptimal information for selecting recipient groups. For example, a messaging data structure may lack attribute information for certain recipient entities (e.g., missing attributes values for age, gender, geographic location, and other attributes). Thus, a communication system is unable to retrieve an accurate listing of appropriate recipients for a given set of electronic messages.

SUMMARY

This disclosure involves modifying messaging data structures having unknown attribute values associated with recipient entities to facilitate retrieval of address data for electronic communications with the recipient entities. For example, a system accesses a first portion of a messaging data structure storing data identifying a first mapping among an online electronic content service, first electronic addresses subscribed to the online electronic content service, and an entity attribute, wherein the first electronic addresses include (i) a target electronic address for a target recipient entity, the target electronic address having a local part and a domain part and (ii) a first plurality of electronic addresses associated with first member recipient entities, wherein the first member recipient entities are respectively associated with first known values of the entity attribute in the first portion of the messaging data structure. The system also accesses a second portion of the messaging data structure storing data identifying a second mapping of second electronic addresses, a common domain part identified in the second electronic addresses, and the entity attribute, wherein the second electronic addresses include (i) the target electronic address for the target recipient entity and (ii) a second plurality of electronic addresses associated with second member recipient entities, wherein the second member recipient entities are respectively associated with second known values of the entity attribute in the second portion of the messaging data structure. The system subsequently determines a first distribution of the first known values of the entity attribute accessed from the first portion of the messaging data structure and a second distribution of the second known values of the entity attribute accessed from the second portion of the messaging data structure. The system computes a predicted value of the entity attribute for the target recipient entity based on the first distribution and the second distribution, updates the messaging data structure with the predicted value, and services a query for electronic addresses having the predicted value by retrieving data describing the target recipient entity from the messaging data structure.

These and other aspects, features and advantages of the present invention may be more clearly understood and appreciated from a review of the following detailed description and by reference to the appended drawings and claims.

DETAILED DESCRIPTION

Improved systems and techniques are disclosed for predicting an unknown value of an entity attribute based on electronic communications involving a target recipient entity and member recipient entities. For example, electronic messages such as e-mails may be transmitted to a large pool of electronic addresses. The electronic messages such as e-mails may be transmitted to electronic addresses subscribed to an online electronic content service. The electronic addresses can correspond to a target recipient entity and member recipient entities. The target recipient entity may be associated with an unknown value of the entity attribute, such as gender or age, and the member recipient entities may be associated with known values of the entity attribute. A message management application executed by a computing system can analyze the known values of the entity attribute to generate a prediction of the unknown value of the entity attribute. The known values of the entity attribute can be associated with member recipient entities sharing a common characteristic with the target recipient entity. Examples of such a common characteristic include a subscription to the same online electronic content service, the same electronic address domain, and/or the same or similar first name.

In a simplified example, a user associated with an electronic address such as "joe.snuffy@domainX.xyz" may subscribe to a first online electronic content service and a second online electronic content service. The message management application can access entity attribute data describing ages, genders, or other attributes for at least some of the electronic addresses subscribed to the first online electronic content service and the second online electronic content service. The message management application can generate a first age distribution for known ages of member recipient entities subscribed to the first online electronic content service (e.g., ages 30-40) and a second age distribution for known ages of member recipient entities subscribed to the second online electronic content service (e.g., ages 35-45).

Based on the overlap between the two age distributions associated with the two online electronic content services, both of which include the electronic address "joe.snuffy@domainX.xyz," the message management application can determine that a predicted age for the user having the electronic address "joe.snuffy@domainX.xyz" is between 35 and 40 years. The message management application can update a messaging data structure, which stores information for the electronic address "joe.snuffy@domainX.xyz," to include the predicted attribute value for this age attribute. Thus, subsequent queries to the messaging data structure for electronic addresses associated with an attribute value of "35-40" will return the electronic address "joe.snuffy@domainX.xyz."

Figure 1:
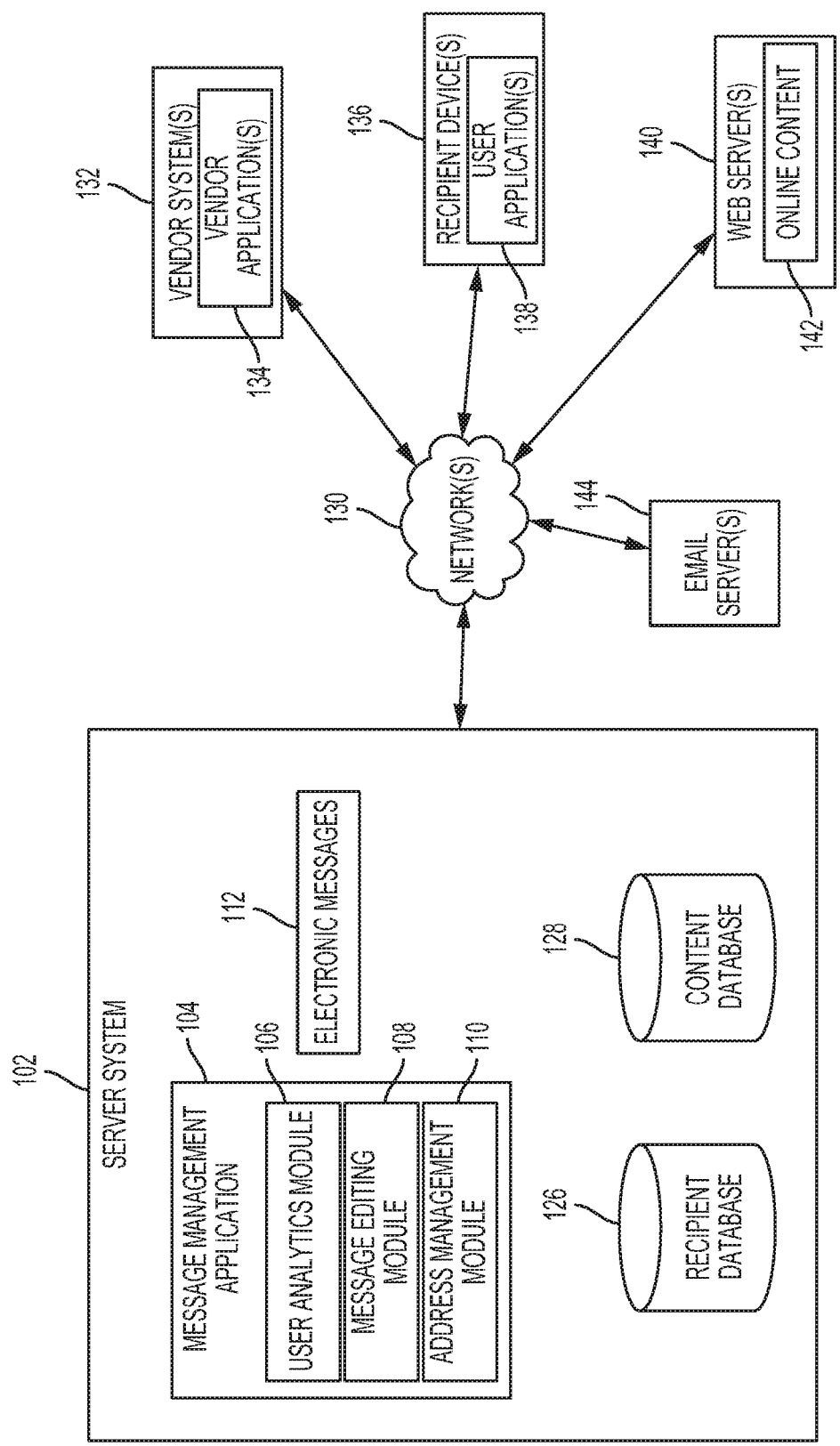
FIG. 1 depicts an example of a system including a server system that executes a message management application for predicting user attributes based on electronic communications involving users, according to certain aspects of the present disclosure.

Referring now to the drawings, FIG. 1 is a block diagram depicting an example of a system including a server system 102 that executes a message management application 104 for predicting user attributes based on electronic communications involving users. The message management application 104 can be used to generate, modify, select, or otherwise use one or more electronic messages 112 for electronic messages to be transmitted via a data network 130 (e.g., e-mails, multimedia messages that can be delivered to smart phones, push notification dialogs, web pages, etc.). The message management application 104 can also be used to analyze and predict attribute data for users to whom various electronic messages 112 are transmitted.

The server system 102 can communicate with one or more vendor systems 132 and one or more recipient devices 136 via one or more signals communicated via one or more data networks 130. The server system 102 can include one or more processing devices. In some embodiments, the server system 102 can be a single server. In other embodiments, the server system 102 can include multiple computing systems that are configured for distributed computer (e.g., grid-based computing, cloud computing, etc.).

The server system 102 can include or have access to one or more non-transitory computer-readable media on which program code and electronic data are stored. The program code includes a message management application 104. The electronic data includes one or more electronic messages 112.

The message management application 104 is executable by a processing device to perform one or more operations for predicting an unknown value of an entity attribute based on data associated with the transmission of electronic messages 112. An electronic message 112 can include electronic data having interactive content, such as clickable images or other clickable content. The interactive content is used by clients to access online content 142 hosted on a web server 140 or other server. For example, the message management application 104 can configure the server system 102 to define a campaign, a marketing program, an advertising plan, or other operation involving the transmission of electronic messages via one or more data networks 130.

The message management application 104 can include one or more suitable software modules. In the example depicted in FIG. 1, the message management application 104 includes a user analytics module 106, a message editing module 108, and an address management module 110. The user analytics module 106 can be used to predict an unknown value of an entity attribute based on electronic messages transmitted to various users. Predicting an unknown value of an entity attribute can include, for example, determining an estimated age range for a user associated with an electronic address, determining a predicted gender for a user associated with an electronic address, determining an estimated geographic location for a user associated with an electronic address, or generating any other prediction of an attribute describing a user associated with an address to which electronic messages 112 can be provided.

The message editing module 108 can provide tools that enable a user to create and edit user content. For example, a vendor application 134 executed at a vendor system 132 can access the message editing module 108 via a data network 130 to create one or more electronic messages for transmission to recipient devices 136. In some embodiments, the message editing module 108 may provide tools that enable a user to create and edit e-mail messages such as may be used in e-mail campaigns. An e-mail campaign is used herein to refer to the process of sending an e-mail (generally the same e-mail) to a particular group of people.

In some embodiments, one or more of the user analytics module 106 and the message editing module 108 can communicate with an e-mail server 144. The e-mail server 144 can prepare and send e-mails or other electronic messages in a campaign to users using electronic addresses stored in address lists of a recipient database 126. Addresses in the recipient database 126 may be entered and organized using tools provided by the address management module 110. In additional or alternative embodiments, a separate e-mail server 144 can be omitted. For example, one or more of the user analytics module 106 and the message editing module 108 can communicate with an e-mail service or other suitable software executed on the server system 102 and can thereby configure the server system 102 to transmit e-mails or other electronic messages.

Figure 2:
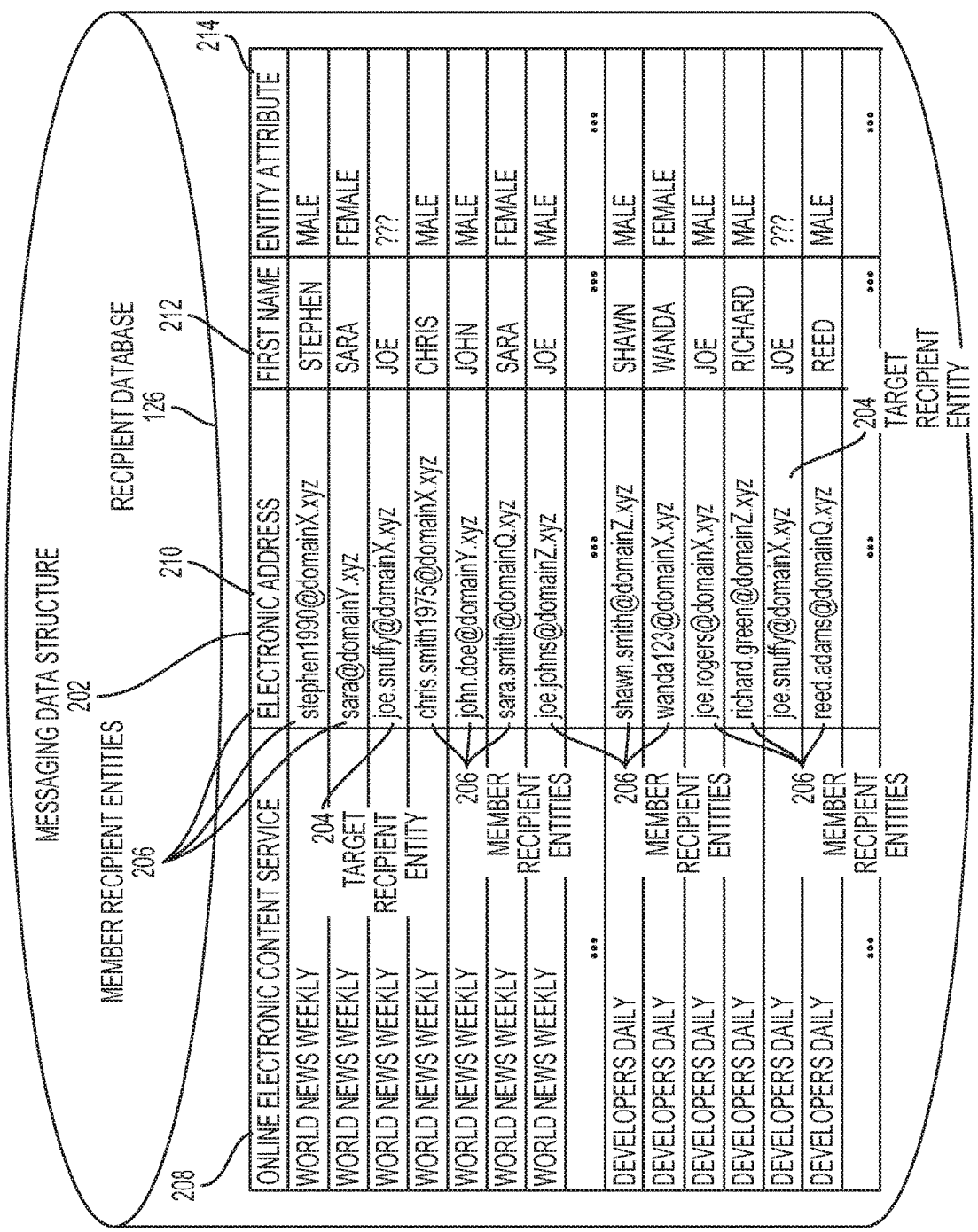
FIG. 2 depicts an example of a messaging data structure within a recipient database, according to certain aspects of the present disclosure.

FIG. 2 is a block diagram depicting an example of a messaging data structure 202 within the recipient database 126. For example, the messaging data structure 202 can map an electronic address 210 to an online electronic content service 208 (e.g., based on the electronic address 210 being subscribed to the online electronic content service 208), a first name 212, and an entity attribute 214. Examples of the online electronic content service 208 can be the fictional World News Weekly and Developers Daily. Examples of the entity attribute 214 can be age and gender. The electronic addresses 210 that are subscribed to World News Weekly can include an electronic address joe.snuffy@domainX.xyz associated with the target recipient entity 204 and electronic addresses for some of the member recipient entities 206. Similarly, the electronic addresses 210 that are subscribed to Developers Daily can include the electronic address joe.snuffy@domainX.xyz for the target recipient entity 204 and electronic addresses for others of the member recipient entities 206. The electronic addresses 210 can be mapped to a first name 212. The electronic address joe.snuffy@domainX.xyz for the target recipient entity 204 can be mapped to an unknown value of the entity attribute 214. Electronic addresses 210 for member recipient entities 206 can be mapped to known values of the entity attribute 214. As described herein, the user analytics module 106 can predict an unknown value of the entity attribute 214 associated with the target recipient entity 204 by determining a distribution of known values of the entity attribute 214 associated with member recipient entities 206 subscribed to the same online electronic service 208 as the target recipient entity 204, member recipient entities 206 having a same or similar first name 212 as the target recipient entity 204, and/or member recipient entities 206 with electronic addresses 210 on the same domain as the electronic address for the target recipient entity 204.

Referring back to FIG. 1, a vendor system 132 can include any computing device or group of computing devices that can access the message management application 104 to generate, modify, or otherwise use one or more electronic messages 112. In some embodiments, a vendor system 132 transmits one or more of the electronic messages 112 to the server system 102 (e.g., via e-mail, via an upload interface presented in a web browser executed at a vendor system 132, etc.). In additional or alternative embodiments, a vendor system 132 remotely accesses the message management application 104 and uses the message management application 104 to generate one or more of the electronic messages 112 (e.g., via a design interface or a data entry interface presented in a web browser executed at a vendor system 132).

The vendor system 132 depicted in FIG. 1 includes one or more processing devices for executing one or more vendor applications 134. A vendor application 134 includes program code that can be executed at the vendor system 132 for transmitting, creating, editing, modifying, or otherwise using one or more electronic messages 112. For example, a vendor application 134 may be used to communicate with the message management application 104 and to thereby generate and send online messages that are associated with a marketing campaign. In some embodiments, a vendor application 134 can be a web browser application or other suitable application that is installed on a non-transitory computer-readable medium accessible to a vendor system 132 and that can be used to remotely access one or more features of the message management application 104. In additional or alternative embodiments, a vendor application 134 can be a dedicated application installed on a non-transitory computer-readable medium that is included in or accessible to a vendor system 132.

The recipient device 136 depicted in FIG. 1 can be any computing device that accesses one or more other computing systems via the data network 130. Non-limiting examples of recipient devices 136 include smart phones, tablet computers, laptop computers, etc. Each recipient device 136 executes one or more user applications 138. A user application 138 is any application suitable for receiving and interacting with electronic messages 112 to which the server system 102 provides access. Non-limiting examples of user applications 138 include web browser applications, e-mail applications, etc.

The web server 140 depicted in FIG. 1 can be any server, computing device, or combination of computing devices that provides access to online content 142 (e.g., webpages) that is accessible via one or more other data networks 130 (e.g., the Internet). Online content 142 may include a website for purchasing products or services that are described or depicted in electronic messages 112. Electronic messages transmitted to user devices can include links to the online content 142 hosted by one or more web servers 140.

For illustrative purposes, the server system 102, the vendor system 132, the web server 140, and the e-mail server 144 are depicted as separate systems. However, other implementations are possible. For example, a server system 102 may perform one or more of executing the message management application 104, executing the vendor application 134, and executing one or more web services that provide access to the online content 142 via the Internet.

The user analytics module 106 can be executed by the server system 102 to predict an unknown value of one or more entity attributes 214 of one or more target recipient entities with electronic addresses 210 in the recipient database 126. The analysis can be performed using known values of the one or more entity attributes 214 associated with member recipient entities 206 sharing a common characteristic with the target recipient entity 204, such as a subscription to the same online electronic content service 208, the same electronic address domain, and/or the same or similar first name 212.

Figure 3:
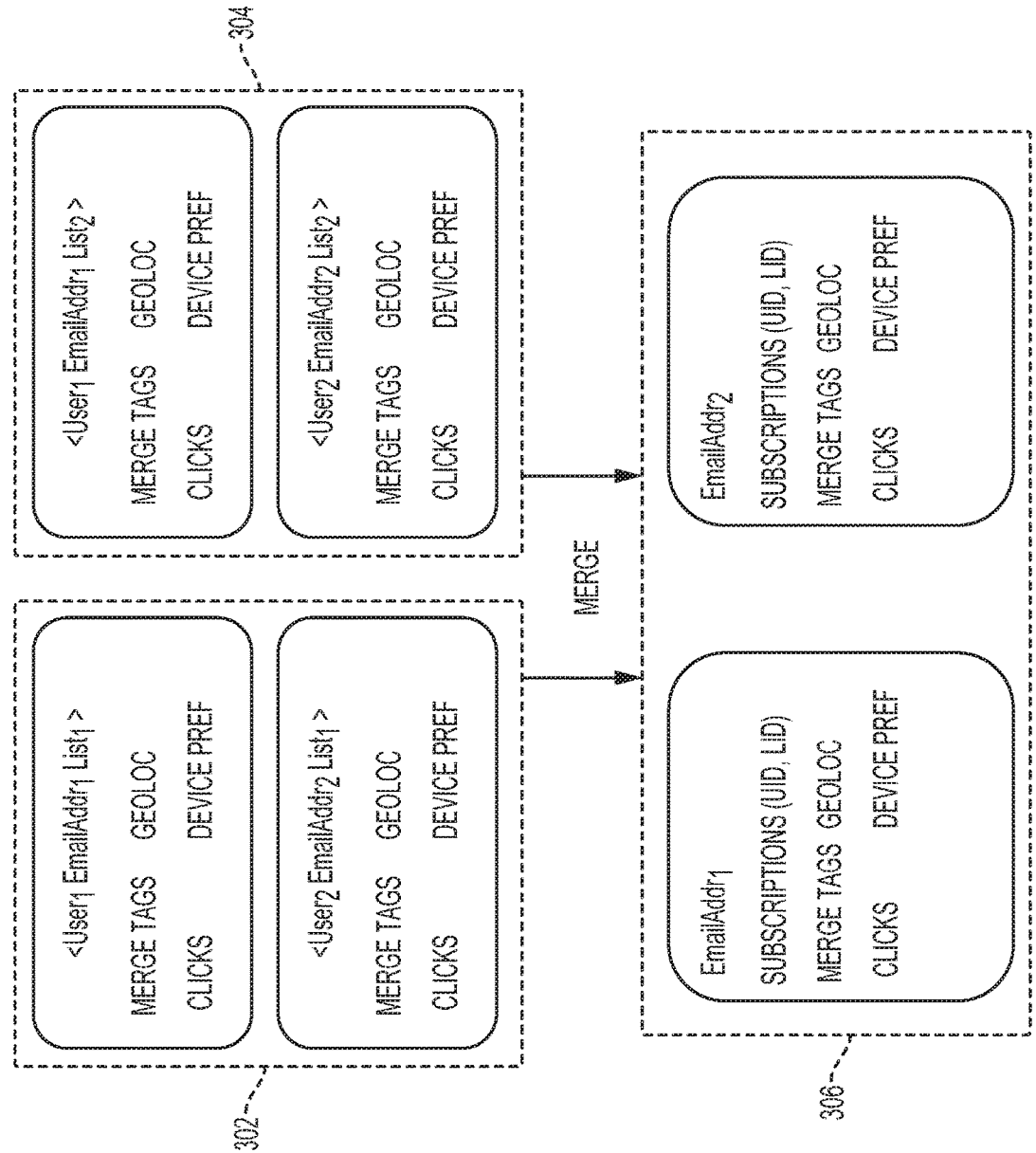
FIG. 3 depicts an example of merging entity attribute data associated with various electronic addresses subscribed to various online electronic content services, according to certain aspects of the present disclosure.
Figure 4:
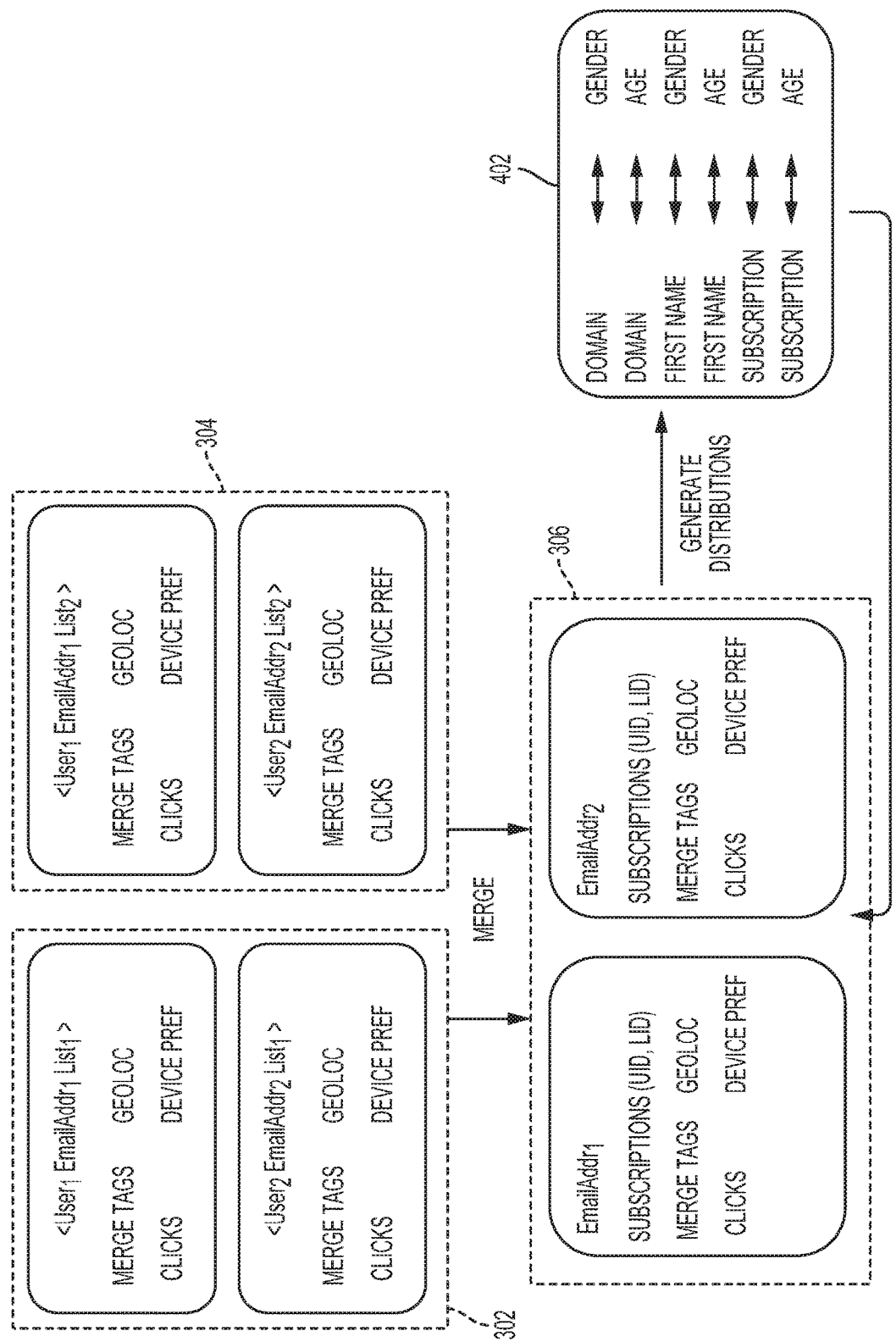
FIG. 4 depicts an example of merging entity attribute data associated with various electronic addresses subscribed to various online electronic content services, generating distributions of the entity attribute data, and feeding back the distributions for predicting unknown entity attribute data, according to certain aspects of the present disclosure.

FIGS. 3 and 4 depict an example of merging known values of entity attributes 214 associated with various electronic addresses 210 subscribed to various online electronic content services 208. The message management application 104 can receive, from one or more vendor applications 134, one or more data sets describing various member recipients who will receive various electronic messages. A first dataset 302 can include a first electronic message to be sent to at least two users ("User$_1$" and "User$_2$") at electronic addresses ("Email$_1$" and "Email$_2$") on a given address list ("List$_1$"). A second dataset 304 can include a second electronic message to be sent to the two users ("User$_1$" and "User$_2$") at the electronic addresses ("Email$_1$" and "Email$_2$") on the address list ("List$_2$"). The first and second data sets 302 and 304 can also include information such as device preferences ("Device pref"), geographic locations ("Geoloc"), and other entity attributes 214. The message management application 104 can consolidate information from different data sets into a merged data set 306 in the recipient database 126. For example, a first electronic address ("Email$_1$") can be associated with various other certain attribute data (subscriptions, device preferences, etc.) in the recipient database 126, and a second electronic address ("Email$_2$") can be associated with various other entity attribute data (subscriptions, device preferences, etc.) in the recipient database 126.

The entity attribute data in the merged data set 306 in the recipient database 126 can be used to generate distributions 402 of known values of various entity attributes 214. For example, the user analytics module 106 or other suitable program code can be executed to generate a distribution of gender data for one or more domains, a distribution of age data for one or more domains, a distribution of gender data for one or more first names 212, a distribution of age data for one or more first names 212, a distribution of gender data for one or more online electronic content service 208 (e.g., address lists for a given set of e-mail content), a distribution of age data for one or more online electronic content services 208, or any other suitable distribution of data.

Figure 5:
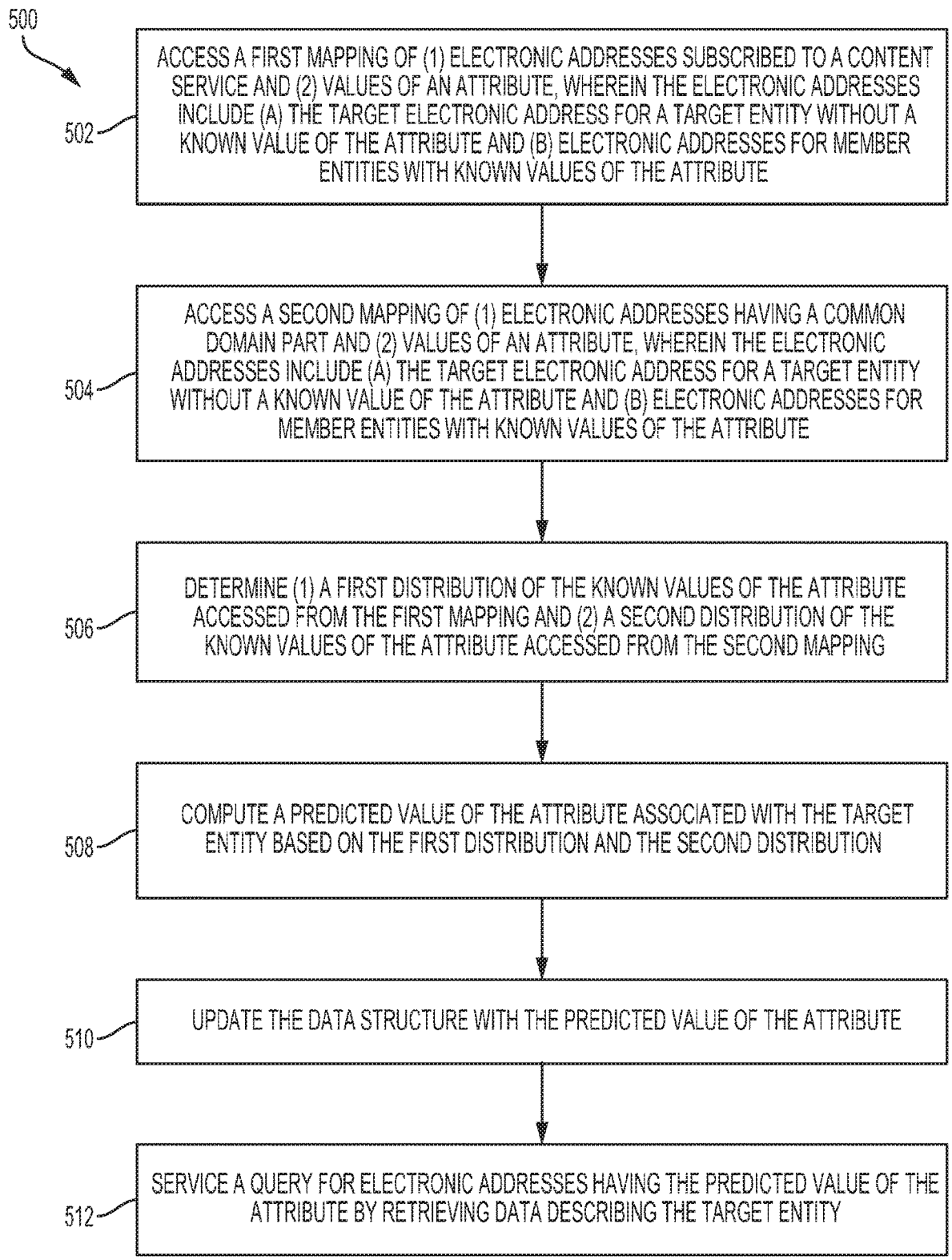
FIG. 5 depicts an example of modifying messaging data structures having unknown attribute values associated with recipient entities to facilitate retrieval of address data for electronic communications with the recipient entities, according to certain aspects of the present disclosure.

The user analytics module 106 can use these distributions to generate predictions of values of various entity attributes 214 that are unknown to the message management application 104. An unknown value of an entity attribute 214 can be predicted using one or more operations described herein. For instance, FIG. 5 depicts an example of a process 500, which may be performed by the message management application 104 or another suitable computing system, that generates a prediction of an unknown value of an entity attribute 214, according to certain embodiments. In some embodiments, one or more processing devices implement operations depicted in FIG. 5 by executing suitable program code (e.g., the user analytics module 106). For illustrative purposes, the process 500 is described with reference to certain examples depicted in the figures. Other implementations, however, are possible.

At block 502, the process 500 involves accessing a first mapping between electronic addresses 210, which are subscribed to an online electronic content service 208, and known values of an entity attribute 214 (e.g., an age attribute, a gender attribute, etc.). The electronic addresses 210 include the electronic address for a target recipient entity 204 without a known value of the entity attribute 214 and electronic addresses 210 for member recipient entities 206 with known values of the entity attribute 214.

A processing device (e.g., one or more processors of the server system 102) can execute one or more modules of the message management application 102 (or suitable other program code) to implement block 502. For example, the program code for the message management application 102, which is stored in a non-transitory computer-readable medium, is executed by one or more processing devices. Executing the message management application 102 causes the processing device to access mapping data from the messaging data structure 202. The accessed mapping data from the messaging data structure 202 can be stored in the same non-transitory computer-readable medium or a different non-transitory computer-readable medium. In some embodiments, accessing the mapping data involves communicating, via a data bus, suitable signals between a local non-transitory computer-readable medium and the processing device. In additional or alternative embodiments, accessing the mapping data involves communicating, via a data network, suitable signals between a computing system that includes the non-transitory computer-readable medium and a computing system that includes the processing device.

In one example, the target recipient entity 204 associated with the electronic address 210 "joe.snuffy@domainX.xyz" may be subscribed to the fictional online electronic content service 208 called "World News Weekly." The gender attribute value associated with this target recipient entity 204 may be unknown. The user analytics module 106 can access known gender attribute values associated with other subscribers to "World News Weekly," or member recipient entities 206, for use in predicting the unknown gender attribute value associated with the target recipient entity 204.

At block 504, the process 500 involves accessing a second mapping of electronic addresses 210, which have a common domain part, with known values of an entity attribute 214. The electronic addresses 210 include the electronic address for a target recipient entity 204 without a known value of the entity attribute 214. The electronic addresses 210 also include electronic addresses 210 for member recipient entities 206 with known values of the entity attribute 214.

A processing device (e.g., one or more processors of the server system 102) can execute the user analytics module 106 or one or more other modules of the message management application 102 (or suitable other program code) to implement block 504. For example, the program code for the message management application 102, which is stored in a non-transitory computer-readable medium, is executed by one or more processing devices. Executing the message management application 102 causes the processing device to access mapping data from the messaging data structure 202. The accessed mapping data from the messaging data structure 202 can be stored in the same non-transitory computer-readable medium or a different non-transitory computer-readable medium. In some embodiments, accessing the mapping data involves communicating, via a data bus, suitable signals between a local non-transitory computer-readable medium and the processing device. In additional or alternative embodiments, accessing the mapping data involves communicating, via a data network, suitable signals between a computing system that includes the non-transitory computer-readable medium and a computing system that includes the processing device.

Continuing with the example above, the electronic address 210 "joe.snuffy@domainX.xyz" associated with the target recipient entity 204 has a domain part "domain.xyz." The user analytics module 106 can access known gender attribute values associated with other electronic addresses 210 having the same domain part for use in predicting the unknown gender attribute value associated with the target recipient entity 204.

At block 506, the process 500 involves determining a first distribution of the known values of the entity attribute 214 accessed from the first mapping in block 502 and a second distribution of the known values of the entity attribute 214 accessed from the second mapping in block 504.

A processing device (e.g., one or more processors of the server system 102) executes one or more modules of the message management application 102 (or suitable other program code) to implement block 506. For example, the program code for the message management application 102, which is stored in a non-transitory computer-readable medium, is executed by one or more processing devices. Executing the message management application 102 causes the processing device to perform one or more operations that implement the determination of block 506.

Continuing with the example above, the user analytics module 106 can determine that, among the member recipient entities 206 that are subscribed to "World News Weekly" with a known gender attribute value, four of the member recipient entities 206 are associated with "male" attribute values and two of the member recipient entities 206 are associated with "female" attribute values. The user analytics module 106 can use this distribution in predicting the unknown gender attribute value associated with the target recipient entity 204. Continuing with the example above, the user analytics module 106 can also determine that, among the member recipient entities 206 that are associated with an electronic address 210 having the same domain part "domain.xyz" as the electronic address 210 associated with the target recipient entity 204, three are associated with a male gender attribute value and one is associated with a female gender attribute value. The user analytics module 106 can also use this distribution in predicting the unknown gender attribute value associated with the target recipient entity 204.

At block 508, the process 500 involves computing a predicted value of the unknown entity attribute 214 associated with the target recipient entity 204 based on the first distribution and the second distribution, both determined in block 506.

A processing device (e.g., one or more processors of the server system 102) executes one or more modules of the message management application 102 (or suitable other program code) to implement block 508. For example, the program code for the message management application 102, which is stored in a non-transitory computer-readable medium, is executed by one or more processing devices. Executing the message management application 102 causes the processing device to perform one or more operations that implement the computation of block 508.

Continuing with the example above, the user analytics module 106 can use the four-male-two-female first distribution and the three-male-one-female second distribution to predict that the unknown gender attribute value associated with the target recipient entity 204 is male.

At block 510, the process 500 involves updating the messaging data structure 202 with the predicted value of the entity attribute 214 associated with the target recipient entity 204 computed from the first and second distributions. For example, the message management application 104 (including any suitable module thereof) can configure the server system 102 or another suitable computing system to implement block 510. The server system 102 can access a non-transitory computer-readable medium in which the messaging data structure 202 is stored and thereby retrieve some or all of the data from the messaging data structure 202. The server system 102 can access a portion of the data in the messaging data structure 202 that describes the target recipient entity (e.g., one or more records for the target recipient entity). The server system 102 can modify the accessed portion of the data in the messaging data structure 202 to include the predicted value of the entity attribute 214. The server system 102 can store the updated messaging data structure 202 in the non-transitory computer-readable medium.

At block 512, the process 500 involves servicing a query for electronic addresses 210 having the predicted value of the entity attribute 214 by retrieving data describing the target entity. For example, the message management application 104 (including any suitable module thereof) can configure the server system 102 or another suitable computing system to implement block 512. The server system 102 can communicate with one or more vendor systems 132 via a data network 130. These communications can include, for example, one or more queries from one or more vendor systems 132. The server system 102 can respond to a received query by accessing a non-transitory computer-readable medium in which the messaging data structure 202 is stored. The server system 102 can service the query by retrieving data from the messaging data structure 202 that matches or otherwise corresponds to one or more search parameters in a received query. The server system 102 can generate and transmit, via the data network 130, a response to one or more vendor system 132. The response can include the data that the server system 102 retrieved as a result of servicing the query.

In some embodiments, the message management application 102 can perform one or more additional operations, such as accessing a third mapping of (1) electronic addresses 210 associated with a common first name and (2) known values of an entity attribute 214, wherein the electronic addresses 210 include (a) the electronic address for a target recipient entity 204 without a known value of the entity attribute 214 and (b) electronic addresses 210 for member recipient entities 206 with known values of the entity attribute 214. In this example, the electronic address 210 "joe.snuffy@domainX.xyz" is associated with the first name "Joe." The user analytics module 106 can access known gender attribute values associated with other electronic addresses 210 associated with the first name "Joe" for use in predicting the unknown gender attribute value associated with the target recipient entity 204.

In these embodiments, block 506 can involve determining a third distribution of the known values of the entity attribute 214 accessed in the third mapping. Continuing with the example provided above, the user analytics module 106 can determine that, among the other electronic addresses 210 associated with the first name "Joe," are associated with the male gender attribute value. The user analytics module 106 can use this distribution in predicting the unknown gender attribute value associated with the target recipient entity 204. Additionally or alternatively, block 508 can involve computing a predicted value of the unknown entity attribute 214 associated with the target recipient entity 204 based on the first distribution, the second distribution, and the third distribution. Continuing with the example provided above, the user analytics module 106 can use the four-male-two-female first distribution, the three-male-one-female second distribution, and the all-male third distribution to predict that the unknown gender attribute value associated with the target recipient entity 204 is male. In such embodiments, at block 510, the process 500 involves updating the messaging data structure 202 with the predicted value of the entity attribute 214 associated with the target recipient entity 204 computed from the first, second, and third distributions.

In some embodiments, the message management application 102 can perform one or more additional operations, such as applying weights to the first distribution and the second distribution by logistic regression modeling to generate a weighted first distribution and a weighted second distribution. For example, the user analytics module 106 can be trained to give more predictive weight to a distribution of known values of an entity attribute 214 determined by accessing member recipient entities 206 subscribed to the same online electronic content service 208 than to a distribution of known values of an entity attribute 214 determined by accessing member recipient entities 206 associated with electronic addresses 210 having the same domain part. The user analytics module 106 can be trained to assign certain predictive weight to certain distributions of known values of an entity attribute 214 using any suitable software machine learning library. One example is the scikit-learn software machine learning library for the Python programming language. In such embodiments, at block 508, the process 500 involves computing the predicted value of the entity attribute 214 for the target recipient entity 204 based on the weighted first distribution and the weighted second distribution. In such embodiments, at block 510, the process 500 involves updating the messaging data structure with the predicted value of the entity attribute computed from the weighted first distribution and the weighted second distribution.

In some embodiments, the message management application 102 can perform one or more additional operations, such as determining at least one of the first three-character sequence and the last three-character sequence of the local part of the electronic address for the target recipient entity. The user analytics module 106 can be trained to associate certain character sequences occurring in the local part of an e-mail address (e.g., the "jon.jones1980" part of the e-mail address "jon.jones1980@domainX.xyz") with a certain age and/or gender attribute value. The user analytics module 106 can be trained to associate certain character sequences with a certain age and/or gender attribute value using any suitable software machine learning library. One example is the scikit-learn software machine learning library for the Python programming language. For example, the user analytics module 106 can determine that the first three-character sequence ("trigram") of the e-mail address "jon.jones1980@domainX.xyz" is "jon" and that the last trigram is "980." The trained machine-learning algorithm can then determine that the target recipient entity 204 associated with that email address is likely a male (based on the "jon" trigram) and was likely born in the year 1980 (based on the "980" trigram). In such embodiments, at block 508, the process 500 involves computing a predicted value of the unknown entity attribute 214 associated with the target recipient entity 204 based on the first distribution, the second distribution, and at least one of the first three-character sequence and the last three-character sequence of the local part of the electronic address 210 for the target recipient entity 204. In such embodiments, at block 510, the process 500 involves updating the messaging data structure 202 with the predicted value of the entity attribute 214 associated with the target recipient entity 204 computed from the first distribution, the second distribution, and at least one of the first three-character sequence and the last three-character sequence of the local part of the electronic address 210 for the target recipient entity 204.

In some embodiments, the message management application 102 can perform one or more additional operations, such as determining a confidence level associated with the predicted value of the entity attribute 214 based on whether the target recipient entity 204 has interacted with an electronic message 112. For example, the user analytics module 106 can determine that a given target recipient entity 204 is likely to be in the age range of 35-45 years. The message management application 104 can subsequently cause an electronic message 112 to be provided to the electronic address 210 associated with the target recipient entity 204. The electronic message 112 can describe a product or service that is typically used by consumers in the age range of 40-50. If the message management application 104 determines that the target recipient entity 204 with the predicted age range of 35-45 years has interacted with the electronic message 112, which describes a product or service that is typically used by consumers in the age range of 40-50, the interaction can provide further data indicating that the target recipient entity 204 is within the age range of 35-45 years. If the message management application 104 determines that the target recipient entity 204 with the predicted age range of 35-45 years has not interacted with the electronic message 112 in a certain way (e.g., clicking a product link), the absence of interaction can be data indicating that the target recipient entity 204 may not be within the age range of 35-45 years. In such embodiments, at block 510, the process 500 involves updating the messaging data structure 202 with the determined confidence level associated with the predicted value of the entity attribute 214.

In some embodiments, the message management application 102 can perform one or more additional operations, such as computing the predicted value of the entity attribute 214 for the target recipient entity 204 by applying a Bayesian inference algorithm to the first distribution and the second distribution. An example of such a computation is described herein with respect to FIGS. 9-13.

Figure 6:
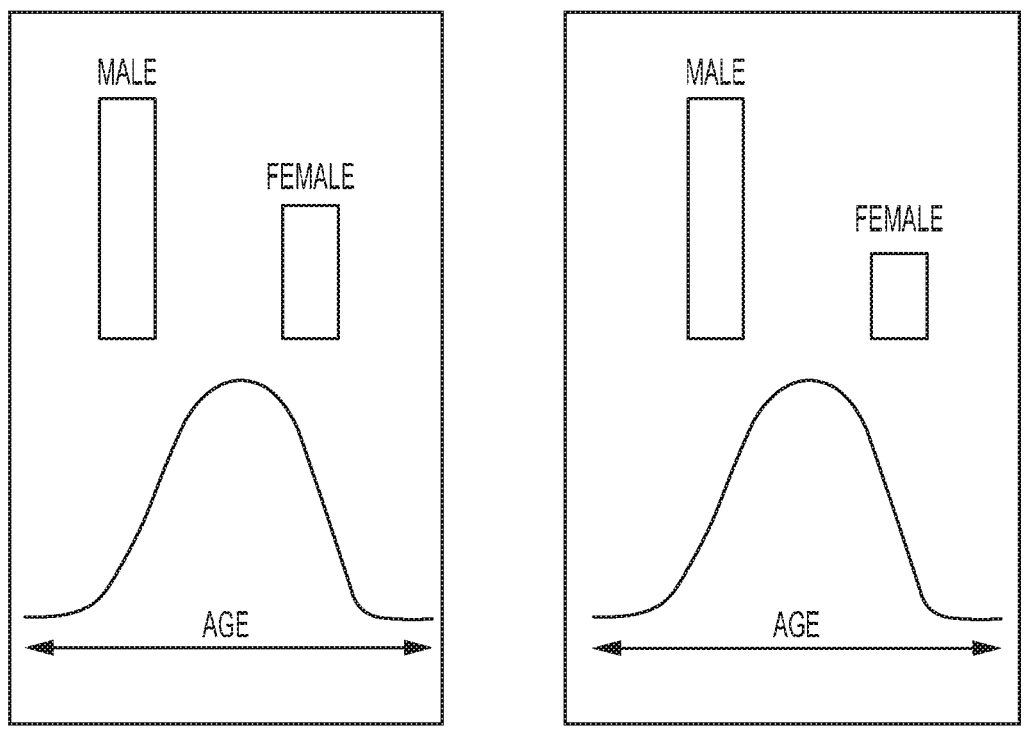
FIG. 6 depicts examples of distributions of gender and age data for online electronic content services to which an electronic address subscribes, according to certain aspects of the present disclosure.

Turning to FIG. 6, the recipient database 126 may include an electronic address "joe.snuffy@domainX.xyz." The recipient database 126 may lack a known value of an entity attribute 214 such as age or gender for this electronic address.

To generate estimates or predictions for this missing data, the user analytics module 106 can use online electronic content service 208 subscriptions of the electronic address "joe.snuffy@domainX.xyz". For example, the user analytics module 106 can access the recipient database 126 or another suitable data structure to identify which online electronic content services 208 include the electronic address "joe.snuffy@domainX.xyz."

The user analytics module 106 can also identify other member recipient entities 206 subscribed to the identified online electronic content services 208. The other member recipient entities 206 can include known values of the entity attribute 214. The user analytics module 106 can determine that other member recipient entities 206 subscribed to a given online electronic content service 208 have certain gender attribute values (e.g., male) and ager attribute values (e.g., "age 33," "age 36").

Figure 7:
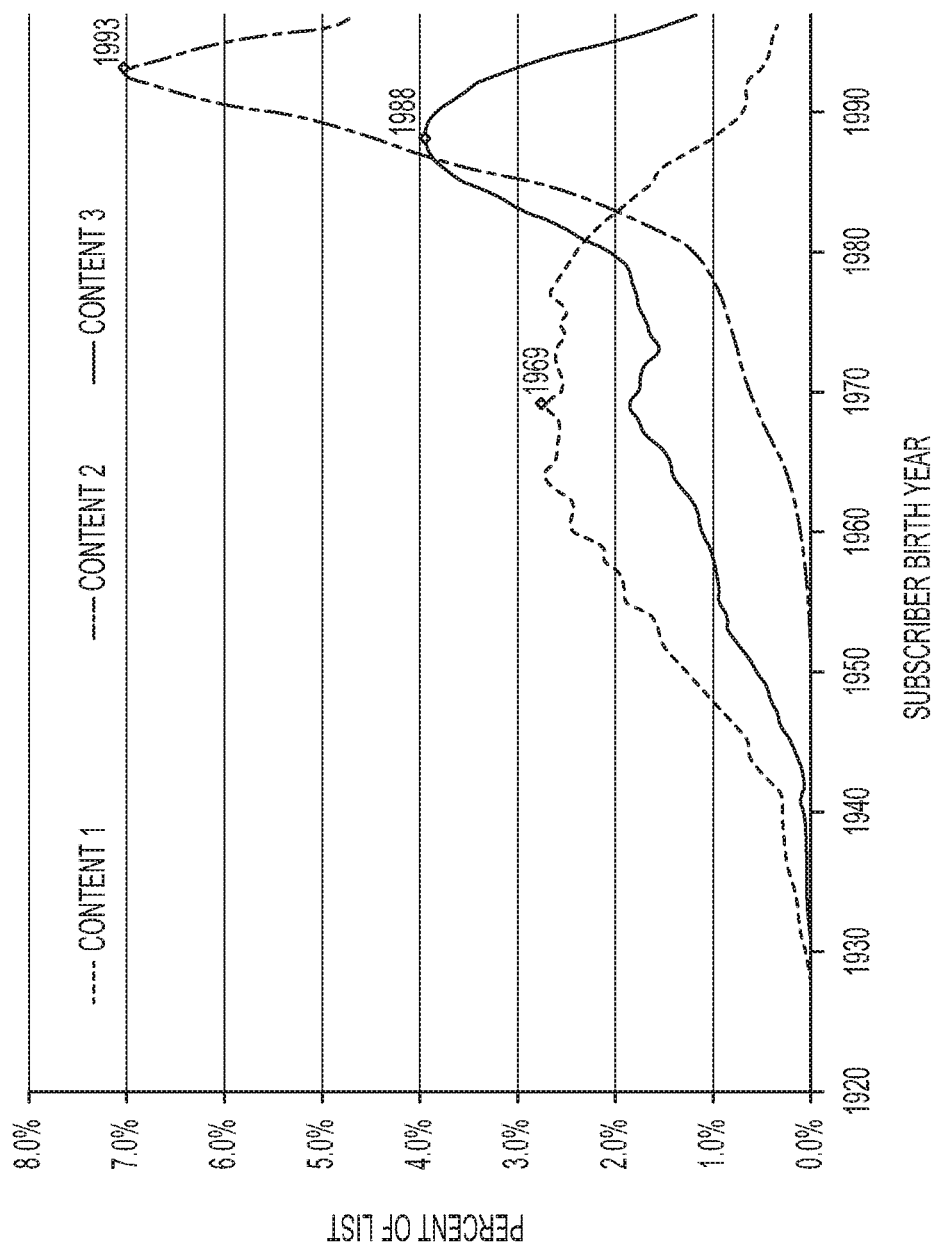
FIG. 7 depicts examples of age distributions for different online electronic content services, according to certain aspects of the present disclosure.
Figure 8:
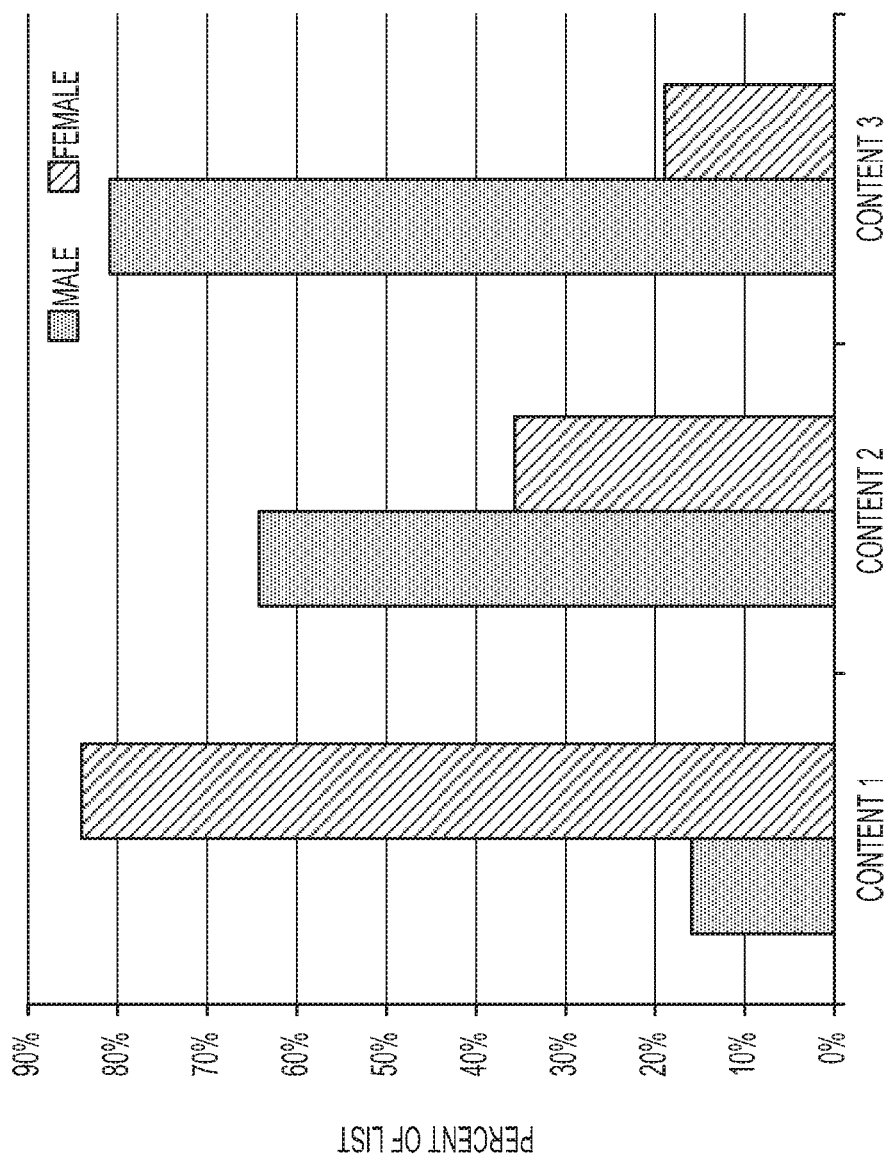
FIG. 8 depicts examples of gender distributions for different online electronic content services, according to certain aspects of the present disclosure.

The user analytics module 106 can use the known values of the entity attribute 214 to generate a distribution of the known values of the entity attribute 214. In the example depicted in FIG. 6, the user analytics module 106 generates or otherwise determines a distribution of the known values of the age entity attribute for each online electronic content service 208 to which the electronic address "joe.snuffy@domainX.xyz" subscribes. An example of an age distribution for different online electronic content services 208 is depicted in FIG. 7. The user analytics module 106 also generates or otherwise determines a distribution of the known values of the gender entity attribute for each online electronic content service 208 to which the electronic address "joe.snuffy@domainX.xy" subscribes. An example of a gender attribute value distribution for a different online electronic content service 208 is depicted in FIG. 8.

For a given entity attribute 214, the user analytics module 106 can determine a likely attribute value based on a combination of known entity attribute value distributions. In a simplified example, the user analytics module 106 can determine that the electronic address "joe.snuffy@domainX.xyz" is subscribed to a first online electronic content service 208 for which the distribution of recipient ages is 30-40. The user analytics module 106 can also determine that the electronic address "joe.snuffy@domainX.xyz" is subscribed to a second online electronic content service 208 for which the distribution of recipient ages is 35-50. The user analytics module 106 can determine that some overlap between these age ranges is likely to include the age of the target recipient entity 204 with the electronic address "joe.snuffy@domainX.xyz." For example, based on these distributions, the user analytics module 106 can generate an estimated age range of 35-40 for the target recipient entity 204 associated with the electronic address "joe.snuffy@domainX.xyz." Similarly, the user analytics module 106 can determine that if the distribution of the known values of the gender entity data for these online electronic content services 208 is heavily skewed toward males, then the target recipient entity 204 associated with the electronic address "joe.snuffy@domainX.xyz" is likely a male.

In predicting an unknown value of the age entity attribute, the user analytics module 106 can optionally determine a distribution of known values of the age entity attribute as percentages of member recipient entities having a known age attribute value in various predetermined age ranges. The user analytics module 106 can determine multiple such distributions, for example one for each online electronic content service 208 that the target recipient entity 204 is subscribed to. The user analytics module 106 can average these multiple distributions into a single distribution for use as an input to one or more suitable automated modeling algorithms executed by the message management application 102 to compute predicted attribute values.

The user analytics module 106 can also use different known entity attribute value distributions in combination with one another to predict or otherwise determine an unknown value of an entity attribute 214. For example, the user analytics module 106 can determine that member recipient entities 206 subscribed to a first online electronic content service 208 are heavily concentrated among women of ages 20-25 and males of ages 35-40. The user analytics module 106 can also determine that member recipient entities 206 subscribed to a second online electronic content service 208 are heavily concentrated among persons of ages 35-50. The user analytics module 106 can thereby predict that if the target recipient entity 204 associated with the electronic address "joe.snuffy@domainX.xyz" is subscribed to both of these online electronic content services 208, he is likely in the age range of 35-40 (based on the overlap in age ranges) and is likely to be a male (based on subscribers to the first online electronic content service 208 within the 35-40 age range typically being males).

Any suitable entity attribute 214 can be used or predicted by the user analytics module 106. Examples of suitable entity attributes 214 at the individual level include (but are not limited to) first name, last name, title, gender or inferred gender, address (country, state, city, zip code) and general location information, birthdate or inferred birth year/age, birthday, company, username, online electronic content service 208 subscriptions, and geolocation. Examples of suitable entity attributes at the list level include (but are not limited to) gender distribution and age distribution. An application programming interface ("API") can be implemented to query known and predicted attributes associated with an electronic address 210. An API can also be implemented to query distributions of attribute data associated with a list.

Although the simplified examples described herein involve relatively few member recipient entities 206, accurate predictions of entity attribute data may involve large volumes of data that require analysis via suitable computing systems. For example, the recipient database 126 may lack entity attribute data for large numbers (e.g., thousands) of member recipient entities 206, may lack reliable data for member recipient entities 206 (e.g., due to spammers providing false user data to the message management application 104), or may otherwise include gaps in data that would be used to predict entity attribute data. A sufficiently large pool of addresses must therefore be used to minimize the impact of these gaps in entity attribute data or incorrect entity attribute data when building distributions of entity attribute data (e.g., age distributions, gender distributions, etc.). For example, entity attribute data for over one million member recipient entities 206 may be needed to minimize the impact of having missing data or false data for several thousand member recipient entities 206. The volume of data required to generate entity attribute distributions that accurately reflect the subscribers to certain types of online electronic content services 208 can require the use of a computing architecture capable of processing these large data sets.

The message management application 104 can utilize any suitable architecture for storing and analyzing large volumes of entity attribute data. One example of such an implementation is Elasticsearch for storing and organizing user data (e.g., in the recipient database 126) and a Bayesian inference modeling technique for generating and analyzing distributions of entity attribute data. For example, six Elasticsearch nodes can be used to store, aggregate, and cache over ten billion records, making use of linear algebra with the NumPy Python package. Also for example, Elasticsearch can be used by operations and delivery for logging, for horizontal scaling, for allowing faster access to subscriber data, and for aggregating across common variables key to analytical models. In additional or alternative embodiments, other suitable storage architectures, other predictive modeling techniques, or some combination thereof may be used.

One or more suitable automated modeling algorithms can be executed by the message management application 102 to compute predicted attribute values. An automated modeling algorithm (e.g., an algorithm using logistic regression, Bayesian inference, neural networks, etc.) that can learn or otherwise identify relationships between known attributes and unknown attributes. An automated modeling algorithm is trained using large volumes of training data. This training data, which can be generated by online interactions with one or more of electronic messages 112 or online content 142, is analyzed by one or more computing devices (e.g., a server system 102). The training data is grouped into attributes, which are provided as inputs to the automated modeling algorithm. The automated modeling algorithm analyzes these attributes to learn from and make predictions regarding data obtained from online transactions. For example, the automated modeling algorithm uses the attributes to learn how to predict a certain unknown attribute value (e.g., age, gender, etc.) based on a context involving other attribute values (e.g., subscription, domain names, n-grams or other tokenized data derived from electronic addresses, etc.) similar to attributes from the training data (e.g., a certain combination of subscription and domain attribute values indicating a high likelihood of a "male" attribute value). This training and predicting can be accomplished using any suitable software machine learning library. One example is the scikit-learn software machine learning library for the Python programming language.

FIGS. 9-13 depict an example of using Bayesian inference to predict a gender for a given target recipient entity 204. The example provided in FIGS. 9-13 is provided for illustrative purposes. In additional or alternative embodiments, other suitable predictive modeling techniques in addition to or other than Bayesian inference may be used, such as logistic regression, classification and regression tree, random forests, gradient tree boosting, etc.

Figure 9:
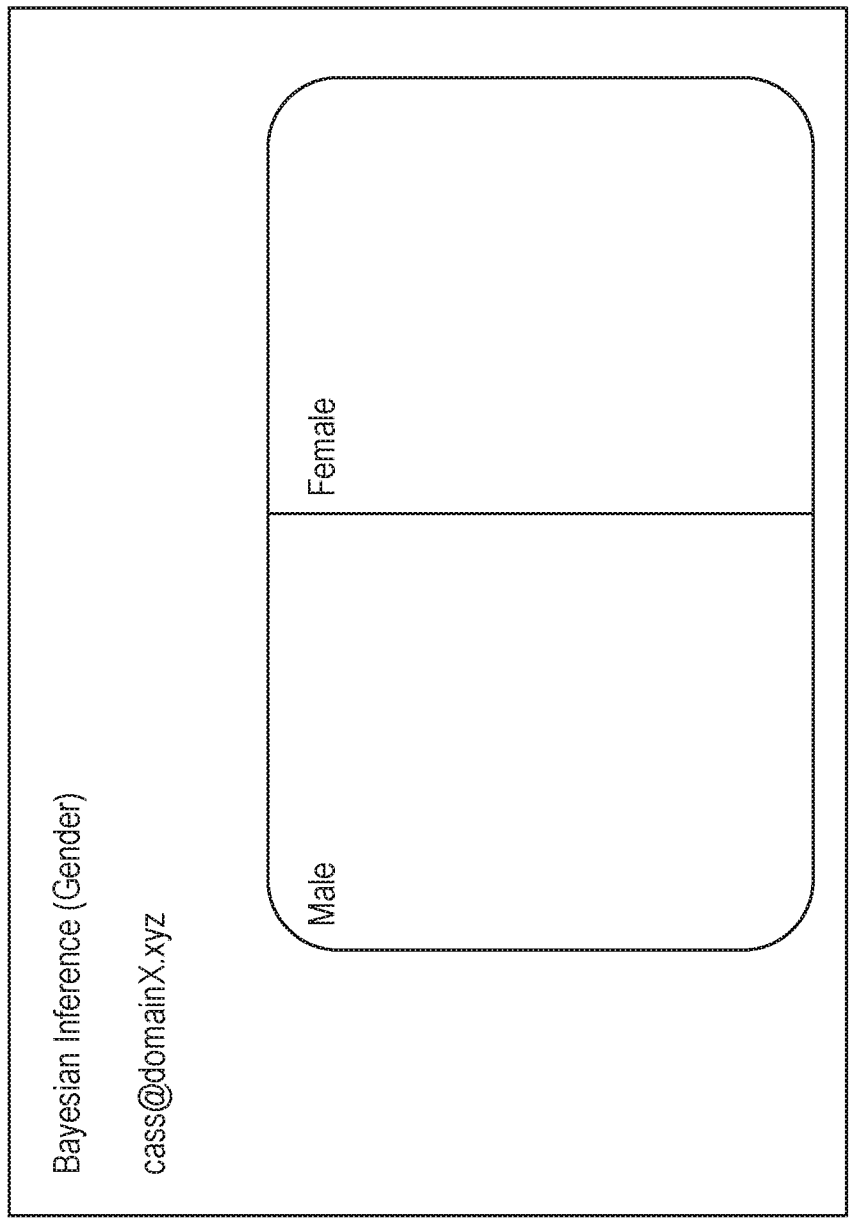
FIG. 9 depicts an example of using Bayesian inference to predict a gender for a given electronic address, according to certain aspects of the present disclosure.
Figure 10:
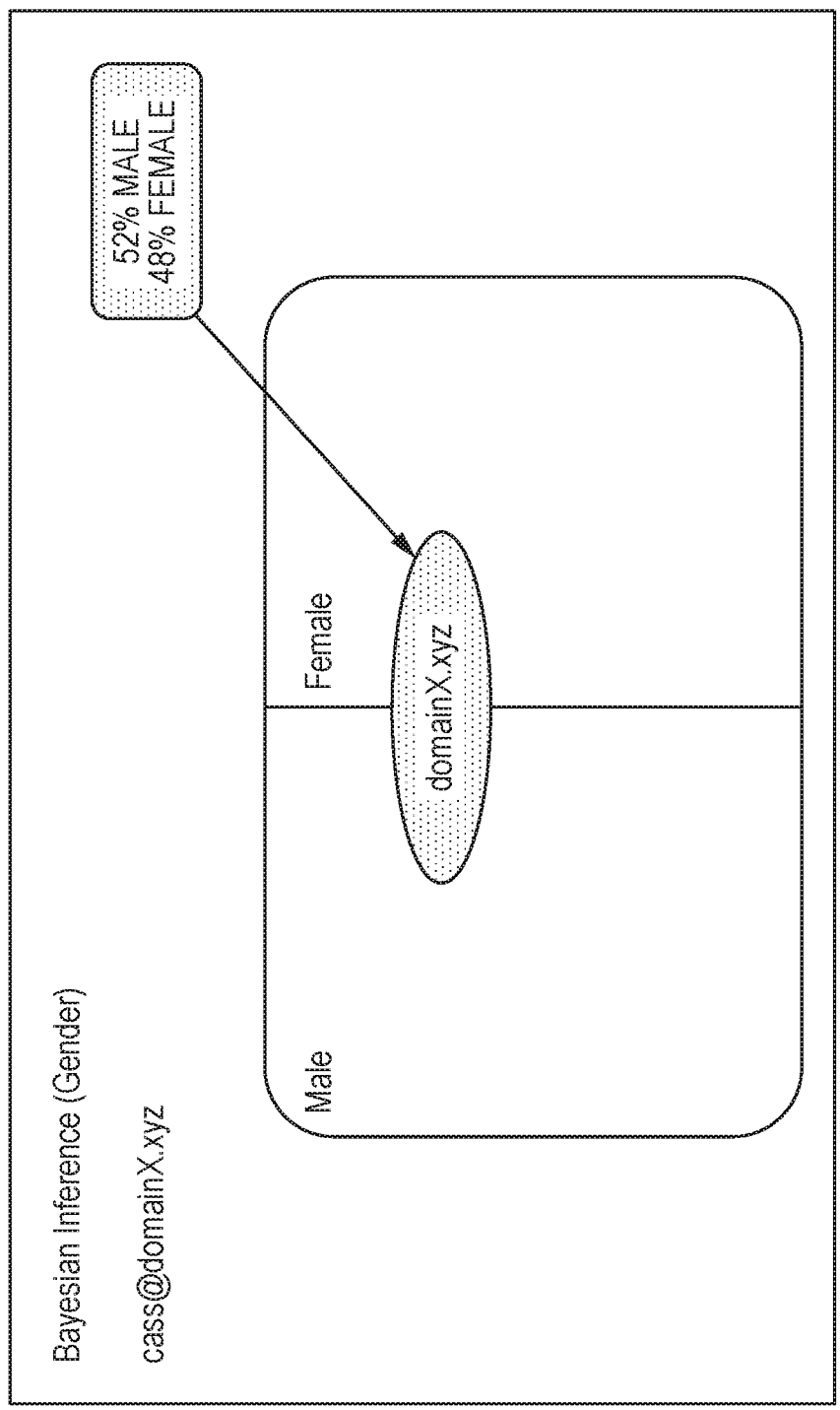
FIG. 10 depicts additional details of the example of using Bayesian inference to predict a gender for a given electronic address, according to certain aspects of the present disclosure.

In this example, the user analytics module 106 identifies an electronic "cass@domainX.xyz" in the recipient database 126, as depicted in FIG. 9. The user analytics module 106 determines that the electronic address 210 includes a domain (i.e., "domainX.xyz"), as depicted in FIG. 10. For member recipient entities 206 having gender data for that domain, 52% are determined to be "male" users and 48% are determined to be "female" users, as depicted in FIG. 10.

Figure 11:
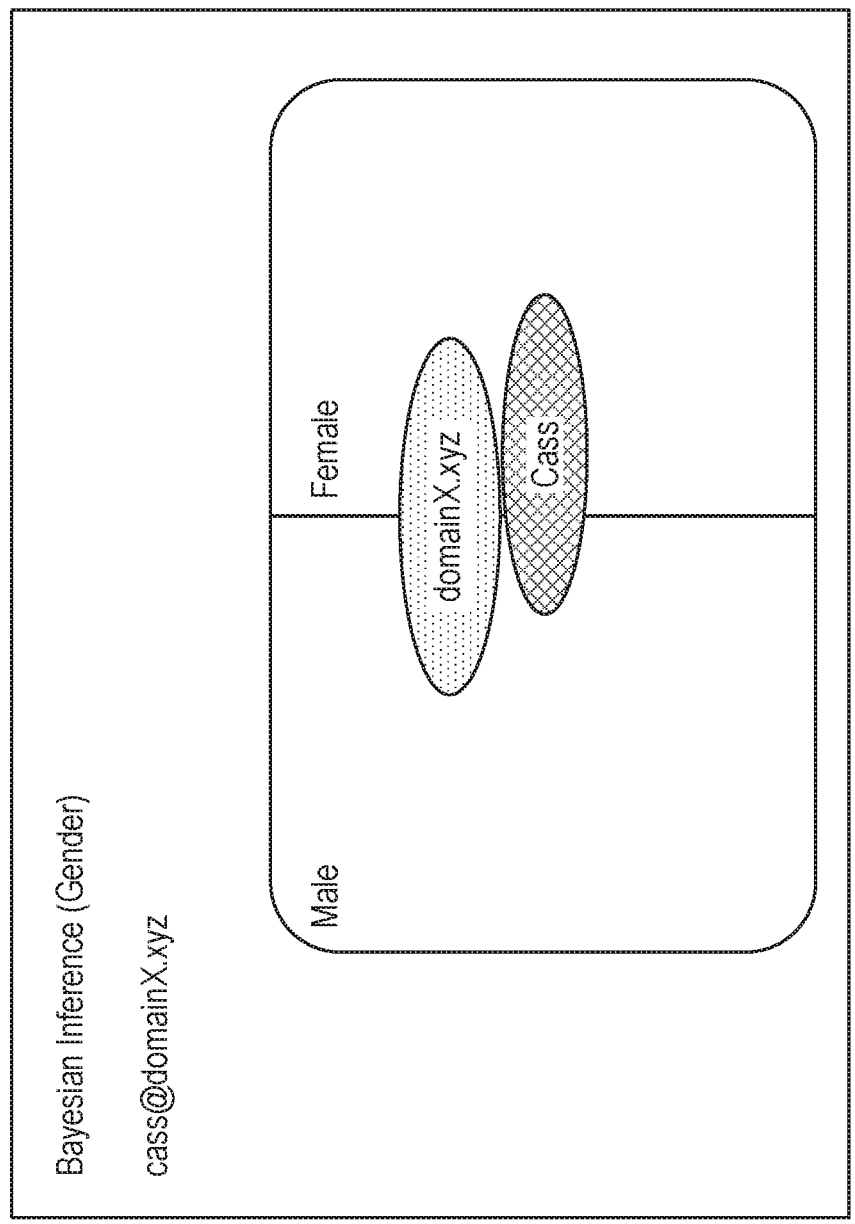
FIG. 11 depicts additional details of the example of using Bayesian inference to predict a gender for a given electronic address, according to certain aspects of the present disclosure.

In this example, the user analytics module 106 also determines that the electronic address 210 is associated with a first name 212 (i.e., "Cass"), as depicted in FIG. 11. The user analytics module 106 determines that the first name "Cass" is associated with female member recipient entities 206 more frequently than with male member recipient entities 206, as depicted in FIG. 11. The user analytics module 106 can make this determination based on, for example, all available member recipient entities 206 (whether or not associated with the "domainX.xyz" domain) having both a known gender and the name "Cass" or a derivative of "Cass" (e.g., "Cassie," "Cassandra," "Castor," etc.).

Figure 12:
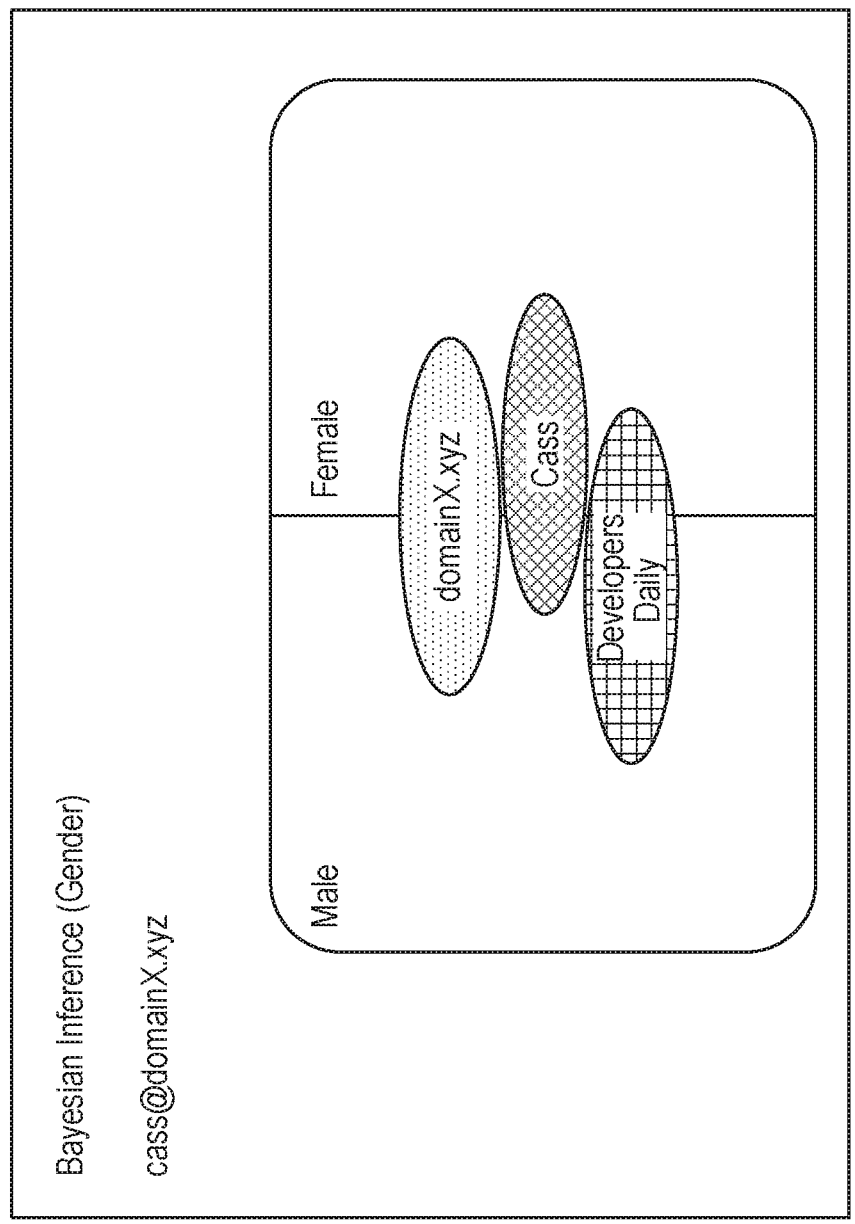
FIG. 12 depicts additional details of the example of using Bayesian inference to predict a gender for a given electronic address, according to certain aspects of the present disclosure.
Figure 13:
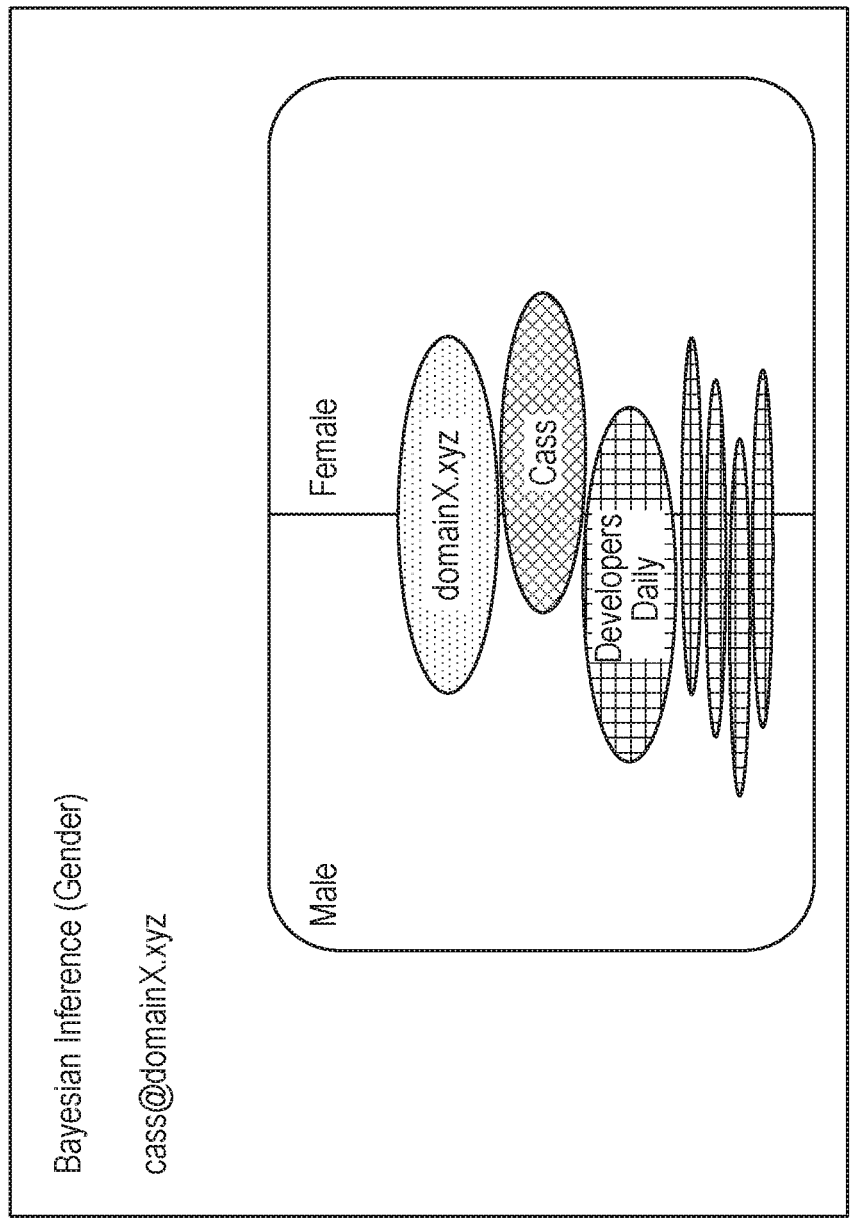
FIG. 13 depicts additional details of the example of using Bayesian inference to predict a gender for a given electronic address, according to certain aspects of the present disclosure.

In this example, the user analytics module 106 also determines that the electronic address 210 is subscribed to the "Developers Daily" online electronic content service 208, as depicted in FIG. 12. The user analytics module 106 determines, based on analyzing member recipient entities 206 associated with the online electronic content service 208 and having known gender data, that the majority of member recipient entities 206 subscribed to the "Developers Daily" online electronic content service 208 are male, as depicted in FIG. 12. The user analytics module 106 can also determine that other online electronic content services 208 to which the electronic address "cass@domainX.xyz" is subscribed are skewed toward the male gender, as depicted in FIG. 13.

The user analytics module 106 can predict a gender associated with the electronic address "cass@domainX.xyz" based on a Bayesian inference algorithm or other suitable predictive modeling techniques. For example, as depicted in FIG. 13, the user analytics module 106 predicts that the gender for the target recipient entity 204 is "male" based on the combination of distributions depicted in FIG. 13, which (considered together) are more indicative of a male target recipient entity 204 than a female target recipient entity 204.

In some embodiments, different weights can be applied to different types of entity attribute distributions when predicting an entity attribute value for a given target recipient entity 204. In the example depicted in FIGS. 9-13, a first name 212 of a target recipient entity 204 may be more indicative of his age than his geographic location. Thus, if the user analytics module 106 is predicting the age of a target recipient entity 204, a distribution of age data for a given first name 212 associated with an electronic address 210 may be given a greater weight than a distribution of age data for a given geographic region associated with the electronic address 210.

The user analytics module 106 or other suitable program module can determine weights for different types of distributions using suitable model training. For example, a supervised machine-learning algorithm (e.g., a neural network) can be trained to associate certain names with certain demographic information (e.g., age, gender, etc.). The training can be performed by providing a data set with verified data to the machine-learning algorithm. The data set can be verified for suitable variance before being provided to the machine-learning algorithm, to avoid use of a data set having near-zero variance for example. The trained machine-learning algorithm can be used to determine the likelihood of one entity attribute value (e.g., the name "Cass") being associated with another entity attribute value (e.g., the gender "female"). The user analytics module 106 or other suitable program module can use the likelihood to apply appropriate weights to different entity attribute distributions when predicting a certain entity attribute value.

In the same manner, the supervised machine-learning algorithm (e.g., a neural network) can also be trained to associate certain character sequences occurring in the local part of an e-mail address (e.g., the "jon.jones1980" part of the e-mail address "jon.jones1980@domainX.xyz") with a certain age and/or gender. For example, the user analytics module 106 can determine that the first three-character sequence ("trigram") of the e-mail address "jon.jones1980@domainX.xyz" is "jon" and that the last trigram is "980." The trained machine-learning algorithm can then determine that the target recipient entity 204 associated with that email address is likely a male (based on the "jon" trigram) and was likely born in the year 1980 (based on the "980" trigram).

In some embodiments, the message management application 104 can use responsive electronic data generated by interactions with electronic messages 112 to assign or modify a confidence level associated with a predicted entity attribute value. For example, the user analytics module 106 can determine that a given target recipient entity 204 is likely to be in the age range of 35-45 years. The message management application 104 can subsequently cause an electronic message 112 to be provided to the electronic address 210 associated with the target recipient entity 204. The electronic message 112 can describe a product or service that is typically used by consumers in the age range of 40-50. If the message management application 104 determines that the target recipient entity 204 with the predicted age range of 35-45 years has interacted with the electronic message 112, which describes a product or service that is typically used by consumers in the age range of 40-50, the interaction can provide further data indicating that the target recipient entity 204 is within the age range of 35-45 years. If the message management application 104 determines that the target recipient entity 204 with the predicted age range of 35-45 years has not interacted with the electronic message 112 in a certain way (e.g., clicking a product link), the absence of interaction can be data indicating that the target recipient entity 204 may not be within the age range of 35-45 years.

Assigning or modifying a confidence level can also involve receiving responsive electronic data that is automatically generated by interactions with electronic messages 112. For example, the message management application 104 can be executed by a suitable processing device to perform one or more operations suitable for assigning or modifying a confidence level, including for example receiving responsive electronic data that indicates how the target recipient entity 204 interacted with an electronic message 112 (e.g., opening the electronic messages 112, clicking on links in the electronic messages 112, etc.). The responsive electronic data can be any data that is automatically generated or provided to the message management application 104 as a result of the target recipient entity 204 interacting with the electronic message 112.

The responsive electronic data can be generated in any suitable manner. In some embodiments, an electronic message 112 can include program code that causes a notification to be transmitted from a recipient device 136 to the server system 102 in response to the electronic message 112 being opened at the recipient device 136. The notification can be transmitted to the server system 102 without notifying a viewer of the electronic message 112 at the recipient device 136.

The message management application 104 can receive any type of responsive electronic data as a result of a recipient device 136 associated with a target recipient entity 204 interacting with an electronic message 112. The responsive electronic data can be generated in any suitable manner. In some embodiments, electronic messages 112 can include program code that causes a notification to be transmitted from a recipient device 136 to the server system 102 in response to the electronic message 112 being opened at the recipient device 136. The notification can be transmitted to the server system 102 without notifying a viewer of the electronic message 112 at the recipient device 136.

In other embodiments, the responsive electronic data can include data that is provided to the message management application 104 as a result of the recipient device 136 accessing online content 142 via an electronic message 112. For example, a link to the online content 142 that is included in an electronic message 112 may include a URL parameter that causes the web server 140 to notify the server system 102 that a link has been clicked. A non-limiting example of the parameter is an alphanumeric string that provides an identifier for a campaign involving the transmission of the electronic messages 112. The web server 140 can use the identifier included in the URL parameter to uniquely identify a visit to the website. The web server 140 can respond to receiving the URL parameter by notifying the server system 102 that a recipient device 136 to which an electronic message 112 was transmitted accessed the online content 142 during a certain time period.

Example of a System Implementation

Figure 14:
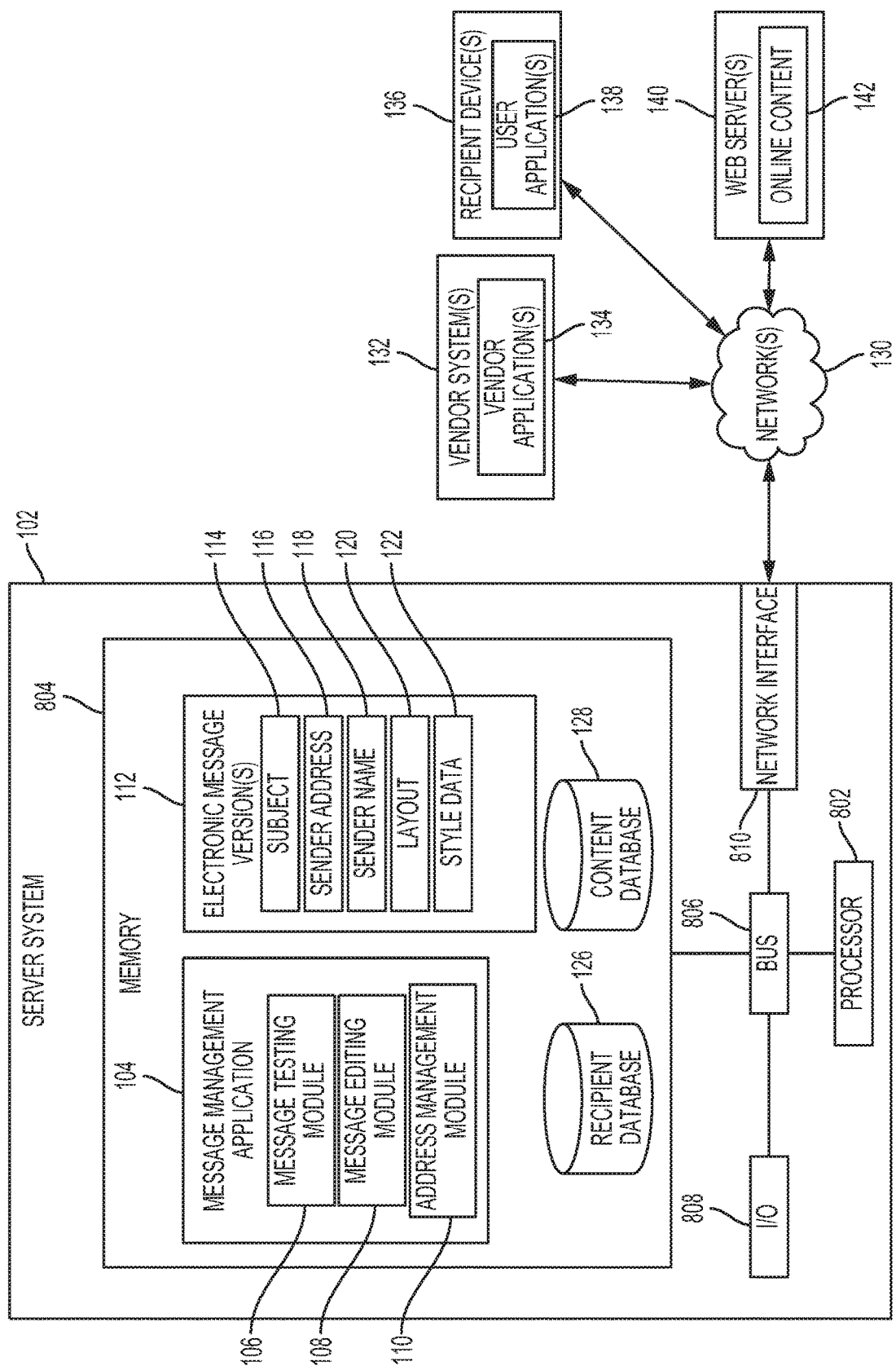
FIG. 14 depicts an example of a server system that executes a message management application for optimizing the effectiveness of different electronic message versions, according to certain aspects of the present disclosure.

Any suitable computing system or group of computing systems can be used to implement the server system 102. For example, FIG. 14 is a block diagram depicting an example of a server system 102 that executes a message management application for optimizing the effectiveness of different electronic message versions.

The server system 102 can include a processor 802 that is communicatively coupled to a memory 804. The processor 802 performs one or more of executing computer-executable program code stored in the memory 804 and accessing information stored in the memory 804. When executed by the processor 802, instructions stored in the memory 804 cause the processor 802 to perform one or more operations described herein. The processor 802 may include a microprocessor, an application-specific integrated circuit ("ASIC"), or other processing device. The processor 802 can include any of a number of processing devices, including one.

The memory 804 can include any suitable computer-readable medium. The computer-readable medium can include any electronic, optical, magnetic, or other storage device capable of providing a processor with computer-readable instructions or other program code. Non-limiting examples of a computer-readable medium include a CD-ROM, DVD, magnetic disk, memory chip, ROM, RAM, an ASIC, optical storage, magnetic tape or other magnetic storage, or any other medium from which a computer processor can read program code. The program code may include processor-specific instructions generated by one or more of a compiler and an interpreter from code written in any suitable computer-programming language, including, for example, C, C++, C #, Visual Basic, Java, Python, Perl, JavaScript, and ActionScript.

The server system 102 may also include a number of external or internal devices such as input or output devices. For example, the server system 102 is shown with an input/output ("I/O") interface 808 that can receive input from input devices or provide output to output devices. A bus 806 can also be included in the server system 102. The bus 806 can communicatively couple one or more components of the server system 102.

The server system 102 can execute program code that configures the processor 802 to perform one or more of the operations described above with respect to FIGS. 1-13. The program code can include, for example, the message management application 104. The program code may be resident in the memory 804 or any suitable computer-readable medium and may be executed by the processor 802 or any other suitable processor. In some embodiments, the electronic messages 112 and associated data can be resident in the memory 804, as depicted in FIG. 14. In other embodiments, one or more of the electronic messages 112 and other associated data can be resident in a memory that is accessible via a data network, such as a memory accessible via a cloud service or other data network service.

The server system 102 can also include at least one network interface 810. The network interface 810 can include any device or group of devices suitable for establishing a wired or wireless data connection to one or more data networks 130. Non-limiting examples of the network interface 810 include an Ethernet network adapter, a modem, and any other suitable communication device. The server system 102 can communicate with one or more vendor systems 132, one of more recipient devices 136, or both using the network interface 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, broken into sub-blocks, or some combination thereof. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, additions to the present subject matter as would be readily apparent to one of ordinary skill in the art.

The invention claimed is:

1. A method for modifying messaging data structures having unknown attribute values associated with recipient entities to facilitate servicing electronic address queries for retrieval of address data, the method comprising:

accessing, by a processing device, a first portion of a messaging data structure storing data identifying a first mapping among an online electronic content service, first electronic addresses subscribed to the online electronic content service, and an entity attribute, wherein the first electronic addresses include (i) a target electronic address for a target recipient entity, the target electronic address having a local part and a domain part and (ii) a first plurality of electronic addresses associated with first member recipient entities, wherein the first member recipient entities are respectively associated with first known values of the entity attribute in the first portion of the messaging data structure;

accessing, by the processing device, a second portion of the messaging data structure storing data identifying a second mapping of second electronic addresses, a common domain part identified in the second electronic addresses, and the entity attribute, wherein the second electronic addresses include (i) the target electronic address for the target recipient entity and (ii) a second plurality of electronic addresses associated with second member recipient entities, wherein the second member recipient entities are respectively associated with second known values of the entity attribute in the second portion of the messaging data structure;

determining, by the processing device, a first distribution of the first known values of the entity attribute accessed from the first portion of the messaging data structure and a second distribution of the second known values of the entity attribute accessed from the second portion of the messaging data structure;

computing, by the processing device, a predicted value of the entity attribute for the target recipient entity based on the first distribution and the second distribution;

transforming, by the processing device, the messaging data structure into an updated messaging data structure comprising the predicted value of the entity attribute, the predicted value being associated with the target recipient entity in the updated messaging data structure;

receiving, by the processing device and from a remote computing system via a data network, a query for electronic addresses having the predicted value of the entity attribute; and servicing, by the processing device, the query by retrieving data describing the target recipient entity from the updated messaging data structure.

2. The method of claim 1, further comprising:

accessing, by the processing device, a third portion of the messaging data structure storing data identifying a third mapping of third electronic addresses, a common first name associated with the third electronic addresses, and the entity attribute, wherein the third electronic addresses include (i) the target electronic address for the target recipient entity and (ii) a third plurality of electronic addresses associated with third member recipient entities, wherein the third member recipient entities are respectively associated with third known values of the entity attribute in the third portion of the messaging data structure;

wherein the processing device further determines a third distribution of the third known values of the entity attribute accessed from the third portion of the messaging data structure; and wherein the processing device computes the predicted value of the entity attribute for the target recipient entity further based on the third distribution.

3. The method of claim 1, wherein the entity attribute associated with the target recipient entity comprises an age or a gender.

4. The method of claim 1, further comprising:

applying weights, by the processing device, to the first distribution and the second distribution by logistic regression modeling to generate a weighted first distribution and a weighted second distribution; and wherein computing the predicted value based on the first distribution and the second distribution comprises computing the predicted value based on the weighted first distribution and the weighted second distribution.

5. The method of claim 1, further comprising:
determining, by the processing device, at least one of a first three-character sequence and a last three-character sequence of the local part of the target electronic address for the target recipient entity; and
wherein the processing device computes the predicted value of the entity attribute for the target recipient entity further based on at least one of the first three-character sequence and the last three-character sequence of the local part of the target electronic address.

6. The method of claim 1, further comprising:
determining, by the processing device, a confidence level associated with the predicted value of the entity attribute based on whether the target recipient entity has interacted with an electronic message,
wherein transforming, by the processing device, the messaging data structure into the updated messaging data structure further comprises associating the confidence level with the predicted value of the entity attribute in the updated messaging data structure.

7. The method of claim 1, wherein computing the predicted value of the entity attribute for the target recipient entity based on the first distribution and the second distribution comprises Bayesian inferencing the first distribution and the second distribution.

8. A system comprising:
a processing device; and
a non-transitory computer-readable medium communicatively coupled to the processing device, wherein the processing device is configured for executing program code stored in the non-transitory computer-readable medium to perform operations comprising:
  accessing a first portion of a messaging data structure storing data identifying a first mapping among an online electronic content service, first electronic addresses subscribed to the online electronic content service, and an entity attribute, wherein the first electronic addresses include (i) a target electronic address for a target recipient entity, the target electronic address having a local part and a domain part and (ii) a first plurality of electronic addresses associated with first member recipient entities, wherein the first member recipient entities are respectively associated with first known values of the entity attribute in the first portion of the messaging data structure;
  accessing a second portion of the messaging data structure storing data identifying a second mapping of second electronic addresses, a common domain part identified in the second electronic addresses, and the entity attribute, wherein the second electronic addresses include (i) the target electronic address for the target recipient entity and (ii) a second plurality of electronic addresses associated with second member recipient entities, wherein the second member recipient entities are respectively associated with second known values of the entity attribute in the second portion of the messaging data structure;
  determining a first distribution of the first known values of the entity attribute accessed from the first portion of the messaging data structure and a second distribution of the second known values of the entity attribute accessed from the second portion of the messaging data structure;
  computing a predicted value of the entity attribute for the target recipient entity based on the first distribution and the second distribution;
  transforming the messaging data structure into an updated messaging data structure comprising the predicted value of the entity attribute, the predicted value being associated with the target recipient entity in the updated messaging data structure; and
  receiving, from a remote computing system, a query for electronic addresses having the predicted value of the entity attribute;
  servicing the query by retrieving data describing the target recipient entity from the updated messaging data structure.

9. The system of claim 8, the operations further comprising:
accessing a third portion of the messaging data structure storing data identifying a third mapping of third electronic addresses, a common first name associated with the third electronic addresses, and the entity attribute, wherein the third electronic addresses include (i) the target electronic address for the target recipient entity and (ii) a third plurality of electronic addresses associated with third member recipient entities, wherein the third member recipient entities are respectively associated with third known values of the entity attribute in the third portion of the messaging data structure;
wherein the determining operation further determines a third distribution of the third known values of the entity attribute accessed from the third portion of the messaging data structure; and
wherein the computing operation computes the predicted value of the entity attribute for the target recipient entity further based on the third distribution.

10. The system of claim 8, wherein the entity attribute associated with the target recipient entity comprises an age or a gender.

11. The system of claim 8, the operations further comprising:
applying weights to the first distribution and the second distribution by logistic regression modeling to generate a weighted first distribution and a weighted second distribution;
wherein computing the predicted value based on the first distribution and the second distribution comprises computing the predicted value based on the weighted first distribution and the weighted second distribution.

12. The system of claim 8, the operations further comprising:
determining at least one of the first three-character sequence and the last three-character sequence of the local part of the target electronic address for the target recipient entity; and
wherein the computing operation computes the predicted value of the entity attribute for the target recipient entity further based on at least one of the first three-character sequence and the last three-character sequence of the local part of the target electronic address.

13. The system of claim 8, the operations further comprising:
determining a confidence level associated with the predicted value of the entity attribute based on whether the target recipient entity has interacted with an electronic message,
wherein transforming the messaging data structure into the updated messaging data structure further comprises associating the confidence level with the predicted value of the entity attribute in the updated messaging data structure.

14. The system of claim 8, wherein computing the predicted value of the entity attribute for the target recipient entity based on the first distribution and the second distribution comprises Bayesian inferencing the first distribution and the second distribution.

15. A non-transitory computer-readable medium having instructions stored thereon, the instructions executable by a processing device to perform operations comprising:
    accessing a first portion of a messaging data structure storing data identifying a first mapping among an online electronic content service, first electronic addresses subscribed to the online electronic content service, and an entity attribute, wherein the first electronic addresses include (i) a target electronic address for a target recipient entity, the target electronic address having a local part and a domain part and (ii) a first plurality of electronic addresses associated with first member recipient entities, wherein the first member recipient entities are respectively associated with first known values of the entity attribute in the first portion of the messaging data structure;
    accessing a second portion of the messaging data structure storing data identifying a second mapping of second electronic addresses, a common domain part identified in the second electronic addresses, and the entity attribute, wherein the second electronic addresses include (i) the target electronic address for the target recipient entity and (ii) a second plurality of electronic addresses associated with second member recipient entities, wherein the second member recipient entities are respectively associated with second known values of the entity attribute in the second portion of the messaging data structure;
    determining a first distribution of the first known values of the entity attribute accessed from the first portion of the messaging data structure and a second distribution of the second known values of the entity attribute accessed from the second portion of the messaging data structure;
    computing a predicted value of the entity attribute for the target recipient entity based on the first distribution and the second distribution;
    transforming the messaging data structure into an updated messaging data structure comprising the predicted value of the entity attribute, the predicted value being associated with the target recipient entity in the updated messaging data structure;
    receiving a query for electronic addresses having the predicted value of the entity attribute;
    servicing the query by retrieving data describing the target recipient entity from the updated messaging data structure.

16. The non-transitory computer-readable medium of claim 15, the operations further comprising:
    accessing a third portion of the messaging data structure storing data identifying a third mapping of third electronic addresses, a common first name associated with the third electronic addresses, and the entity attribute, wherein the third electronic addresses include (i) the target electronic address for the target recipient entity and (ii) a third plurality of electronic addresses associated with third member recipient entities, wherein the third member recipient entities are respectively associated with third known values of the entity attribute in the third portion of the messaging data structure;
    wherein the determining operation further determines a third distribution of the third known values of the entity attribute accessed from the third portion of the messaging data structure; and
    wherein the computing operation computes the predicted value further based on the third distribution.

17. The non-transitory computer-readable medium of claim 15, wherein the entity attribute associated with the target recipient entity comprises an age or a gender.

18. The non-transitory computer-readable medium of claim 15, the operations further comprising:
    applying weights to the first distribution and the second distribution by logistic regression modeling to generate a weighted first distribution and a weighted second distribution; and
    wherein computing the predicted value based on the first distribution and the second distribution comprises computing the predicted value based on the weighted first distribution and the weighted second distribution.

19. The non-transitory computer-readable medium of claim 15, the operations further comprising:
    determining at least one of the first three-character sequence and the last three-character sequence of the local part of the target electronic address for the target recipient entity; and
    wherein the computing operation computes the predicted value of the entity attribute for the target recipient entity further based on at least one of the first three-character sequence and the last three-character sequence of the local part of the target electronic address.

20. The non-transitory computer-readable medium of claim 15, the operations further comprising:
    determining a confidence level associated with the predicted value of the entity attribute based on whether the target recipient entity has interacted with an electronic message,
    wherein transforming the messaging data structure into the updated messaging data structure further comprises associating the confidence level with the predicted value of the entity attribute in the updated messaging structure.

21. The non-transitory computer-readable medium of claim 15, wherein computing the predicted value of the entity attribute for the target recipient entity based on the first distribution and the second distribution comprises Bayesian inferencing the first distribution and the second distribution.

* * * * *